United States Patent
Hara

(10) Patent No.: US 8,971,660 B2
(45) Date of Patent: Mar. 3, 2015

(54) NOISE REDUCTION DEVICE, NOISE REDUCTION METHOD, NOISE REDUCTION PROGRAM, AND RECORDING MEDIUM

(75) Inventor: Takayuki Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 865 days.

(21) Appl. No.: 13/138,185

(22) PCT Filed: Feb. 18, 2010

(86) PCT No.: PCT/JP2010/052913
§ 371 (c)(1),
(2), (4) Date: Jul. 18, 2011

(87) PCT Pub. No.: WO2010/106887
PCT Pub. Date: Sep. 23, 2010

(65) Prior Publication Data
US 2011/0274350 A1    Nov. 10, 2011

(30) Foreign Application Priority Data

Mar. 16, 2009  (JP) .................................. 2009-062876

(51) Int. Cl.
*G06K 9/40*    (2006.01)
*H04N 9/64*    (2006.01)
*G06T 5/20*    (2006.01)
(Continued)

(52) U.S. Cl.
CPC  *H04N 9/646* (2013.01); *G06T 5/20* (2013.01); *H04N 5/213* (2013.01); *G06T 5/002* (2013.01); *H04N 1/409* (2013.01); *G06T 2207/10024* (2013.01)
USPC .......................................... 382/275; 382/167

(58) Field of Classification Search
None
See application file for complete search history.

(56) References Cited

U.S. PATENT DOCUMENTS 6,195,467 B1 * 2/2001 Asimopoulos et al. ........ 382/261
6,970,268 B1 * 11/2005 Shin et al. ...................... 358/1.9
(Continued)

FOREIGN PATENT DOCUMENTS

| JP | 2002222416 A | 8/2002 |
| JP | 2002259965 A | 9/2002 |

(Continued)

OTHER PUBLICATIONS

Cree, M. J., "Observations on Adaptive Vector Filters for Noise Reduction in Color Images," IEEE Signal Processing Letters, vol. 11, No. 2, Feb. 1, 2004.

(Continued)

*Primary Examiner* — Jayesh A Patel
(74) *Attorney, Agent, or Firm* — Harness, Dickey & Pierce, P.L.C.

(57) ABSTRACT

Disclosed is a noise reduction device that includes a representative-value vector calculation unit that extracts from the neighboring region the pixels of a similarity region having a degree of similarity, greater than or equal to a threshold, to the notice pixel in a predetermined color space and calculates a representative-value vector of the pixels of the similarity region; a difference projection unit that projects a difference vector between a notice-pixel vector of the notice pixel and the representative-value vector in a specific direction of the color space; and a pixel-value correction unit that replaces an element of a vector obtained by adding the difference vector projected in the specific direction to the representative-value vector with the pixel value of the notice pixel.

11 Claims, 23 Drawing Sheets

(51) Int. Cl.
*H04N 5/213* (2006.01)
*G06T 5/00* (2006.01)
*H04N 1/409* (2006.01)

(56) References Cited

U.S. PATENT DOCUMENTS

| | | | |
|---|---|---|---|
| 8,482,625 B2 * | 7/2013 | Staelin et al. | 348/222.1 |
| 2003/0152287 A1 | 8/2003 | Nakajima et al. | |
| 2006/0078216 A1 | 4/2006 | Kaku | |
| 2006/0103892 A1 * | 5/2006 | Schulze et al. | 358/463 |
| 2006/0226337 A1 | 10/2006 | Lim et al. | |
| 2007/0242875 A1 | 10/2007 | Tanaka et al. | |
| 2008/0152222 A1 | 6/2008 | Takeuchi | |
| 2010/0027906 A1 | 2/2010 | Hara et al. | |

FOREIGN PATENT DOCUMENTS

| | | |
|---|---|---|
| JP | 2005071389 A | 3/2005 |
| JP | 2006060744 A | 3/2006 |
| JP | 2006129442 A | 5/2006 |
| JP | 2007150441 A | 6/2007 |
| JP | 2007288439 A | 11/2007 |
| JP | 2007336222 A | 12/2007 |
| JP | 2008160740 A | 7/2008 |
| JP | 2008205737 A | 9/2008 |
| JP | 4178919 B | 11/2008 |
| JP | 4178919(B2) * | 11/2008 ................ G06T 5/00 |
| JP | 2010057157 A | 3/2010 |
| WO | WO-2005081542 A1 | 9/2005 |
| WO | WO-2008102677 A1 | 8/2008 |

OTHER PUBLICATIONS

Extended European Search Report dated May 13, 2013.
"ε-Separating Non-linear Digital Filter and Its Application," The transactions A of the Institute of Electronics, Information and Communication Engineers, vol. J65-A, No. 4, pp. 297-304, 1982 by Hiroshi Harashima, Kaoru Odajima, Yoshiaki Shishikui, and Hiroshi Miyagawa (with partial English translation).
Bilateral Filtering for Gray and Color Images, Proc. Sixth Int'l Conf. Computer Vision, pp. 839-846, 1998 by C. Tomasi and R. Manduchi.
Automatic Estimation and Removal of Noise from a Single Image, IEEE Trans. Pattern Analysis and Machine Intelligence, vol. 30, No. 2, pp. 299-314, 2008 by Ce Liu, et.al.

* cited by examiner

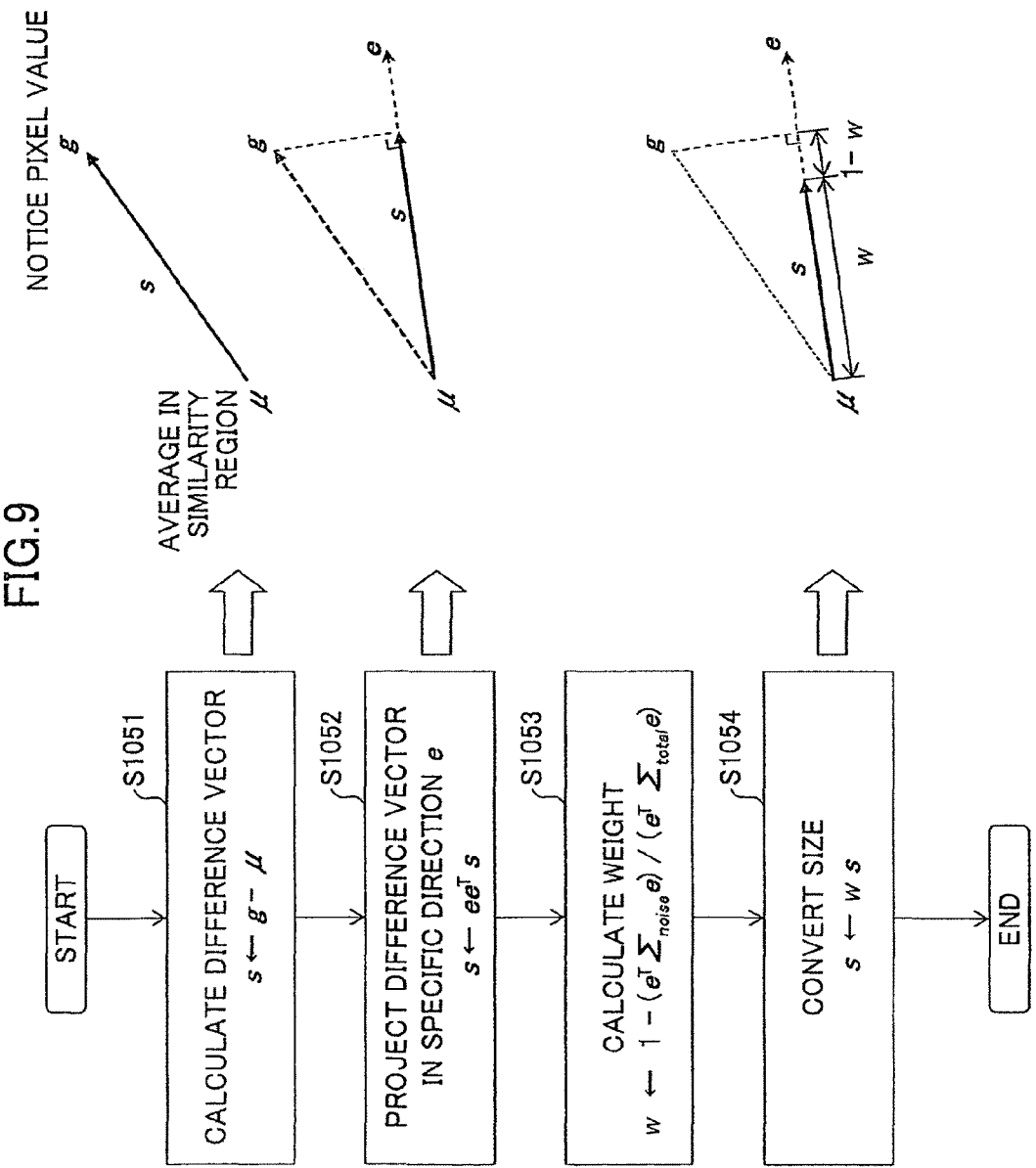

FIG.18

| 1 | -1 | 1 | -1 | 1 |
|---|---|---|---|---|
| -1 | 1 | -1 | 1 | -1 |
| 1 | -1 | 1 | -1 | 1 |
| -1 | 1 | -1 | 1 | -1 |
| 1 | -1 | 1 | -1 | 1 |

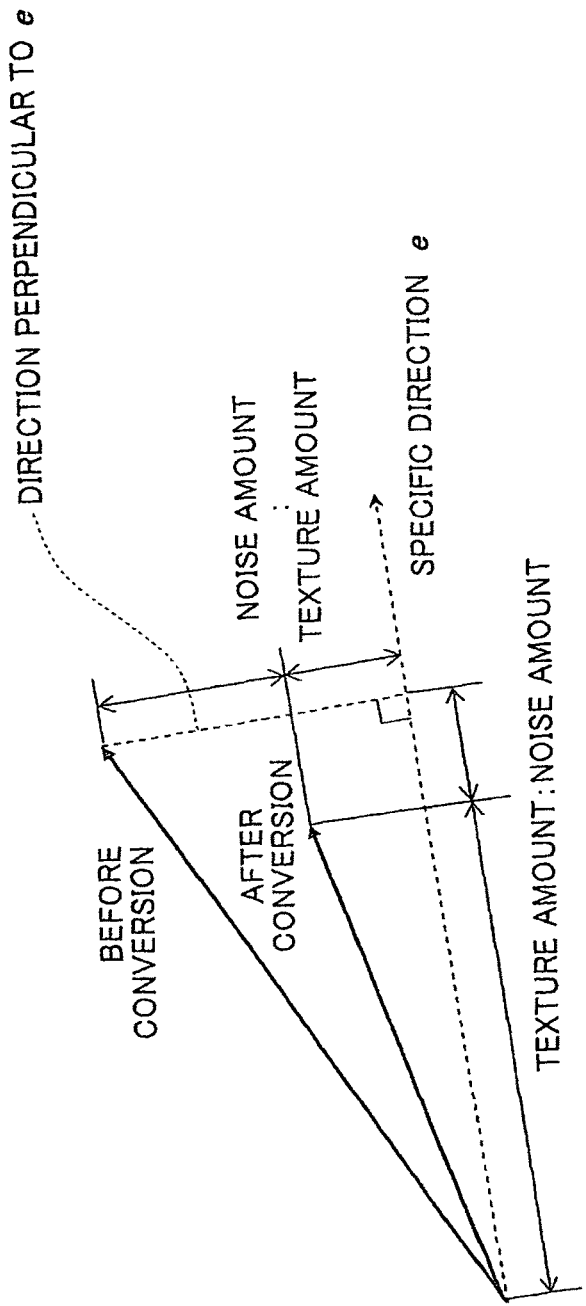

NOISE REDUCTION DEVICE, NOISE REDUCTION METHOD, NOISE REDUCTION PROGRAM, AND RECORDING MEDIUM

TECHNICAL FIELD

The present invention relates to a noise reduction apparatus and a noise reduction method for reducing noise in color images. Also, it relates to a program and a recording medium used therefor.

BACKGROUND ART

Images picked up by image pick-up equipment such as scanners and digital cameras contain noise such as dark current noise, thermal noise, and shot noise due to the characteristics of image pick-up devices and circuits. In order to obtain high-quality images, processing for reducing the noise described above must be performed. If the noise is reduced simply by the use of a low-pass filter, however, significant elements such as an edge with which humans perceive images are lost at the same time, which results in degradation of image quality. Accordingly, technologies for reducing the noise in accordance with the characteristics of the regions of images have been demanded.

As one of such noise reduction technologies, an ϵ-filter has been proposed (see, for example, Non-Patent Document 1). The ϵ-filter uses peripheral pixels having a signal difference, less than or equal to a specific threshold, to a notice pixel so as to perform filter processing, which in turn makes it possible to reduce noise while preserving components such as an edge having a large signal difference.

Furthermore, there has been proposed a noise reduction technology using a bilateral filter (see, for example, Non-Patent Document 2). The bilateral filter generates the weighting coefficient of the filter based on a signal difference and a space difference with respect to a notice pixel so as to perform filter processing, which in turn makes it possible to reduce noise while preserving an edge as in the case of the ϵ-filter. Note that besides the above technologies, there have been proposed ones that reduce noise based on a principle in conformity with the bilateral filter (see, for example, Patent Documents 1 and 2).

However, the ϵ-filter and the bilateral filter have a problem in that signal components of a background part having a small amplitude are likely to be lost. Therefore, there has been proposed a technology for solving this problem (see, for example, Patent Document 3). Patent Document 3 discloses a technology for performing the weighted addition of an ϵ-filter output value and a notice pixel value at a ratio corresponding to a space frequency neighboring the notice pixel.

However, even the method described in Patent Document 3 cannot deal with non-additive noise such as shot noise, and it is poor in noise reduction performance with respect to color images. Meanwhile, there has been proposed a technology for reducing non-additive noise in color images (see, for example, Non-Patent Document 3), but this method requires an enormous processing cost for segmenting images and calculating a statistics value.

Patent Document 1: JP-A-2008-205737
Patent Document 2: JP-A-2007-288439
Patent Document 3: JP-A-2002-259965
Non-Patent Document 1: "ϵ-Separating Non-linear Digital Filter and Its Application," The transactions A of the Institute of Electronics, Information and Communication Engineers, Vol. J65-A, No. 4, pp. 297-304, 1982 by Hiroshi Harashima, Kaoru Odajima, Yoshiaki Shishikui, and Hiroshi Miyagawa
Non-Patent Document 2: "Bilateral Filtering for Gray and Color Images," Proc. Sixth Int'l Conf. Computer Vision, pp. 839-846, 1998 by C. Tomasi and R. Manduchi
Non-Patent Document 3: "Automatic Estimation and Removal of Noise from a Single Image," IEEE Trans. Pattern Analysis and Machine Intelligence, vol. 30, no. 2, pp. 299-314, 2008 by Ce Liu, et. al.

DISCLOSURE OF INVENTION

The present invention has been made in view of the above problems in the related arts and may provide a noise reduction apparatus and a noise reduction method for reducing noise while preserving significant elements such as an edge with which humans perceive images, preserving a signal having a small amplitude, and reducing non-additive noise in color images with high accuracy and at a low processing cost. Also, the present invention may provide a program and a recording medium used therefor.

According to an aspect of the present invention, there is provided a noise reduction device that applies noise reduction processing to a pixel value of a notice pixel of a color image by using pixel values of pixels including the notice pixel of a neighboring region. The noise reduction device includes a representative-value vector calculation unit that extracts from the neighboring region the pixels of a similarity region having a degree of similarity, greater than or equal to a threshold, to the notice pixel in a predetermined color space and calculates a representative-value vector of the pixels of the similarity region; a difference projection unit that projects a difference vector between a notice-pixel vector of the notice pixel and the representative-value vector in a specific direction of the color space; and a pixel-value correction unit that replaces an element of a vector obtained by adding the difference vector projected in the specific direction to the representative-value vector with the pixel value of the notice pixel.

BRIEF DESCRIPTION OF DRAWINGS

FIG. 9 shows an example of a detailed flow of step S105.

FIG. 18 shows an example of a filter having a size of 5×5 pixels;

FIGS. 21A and 21B show examples of diagrams for schematically illustrating the projection of the difference vector in a two-dimensional direction.

BEST MODE FOR CARRYING OUT THE INVENTION

Next, a description is made of the best mode for carrying out embodiments of the present invention with reference to the accompanying drawings.

First Embodiment

This embodiment refers to a noise reduction device 100 that reduces non-additive noise, whose intensity depends on a signal value, in color images where each pixel has three components of R, G, and B. In the following description, a signal value is called a pixel value as occasion demands. The noise reduction device 100 of this embodiment can preferably be applied to digital cameras, scanners, and mobile phones with cameras so long as they pick up color images. In addition, noise reduction processing of this embodiment can be applied to color images read out from storage media by computers and acquired via networks.

Figure 1:
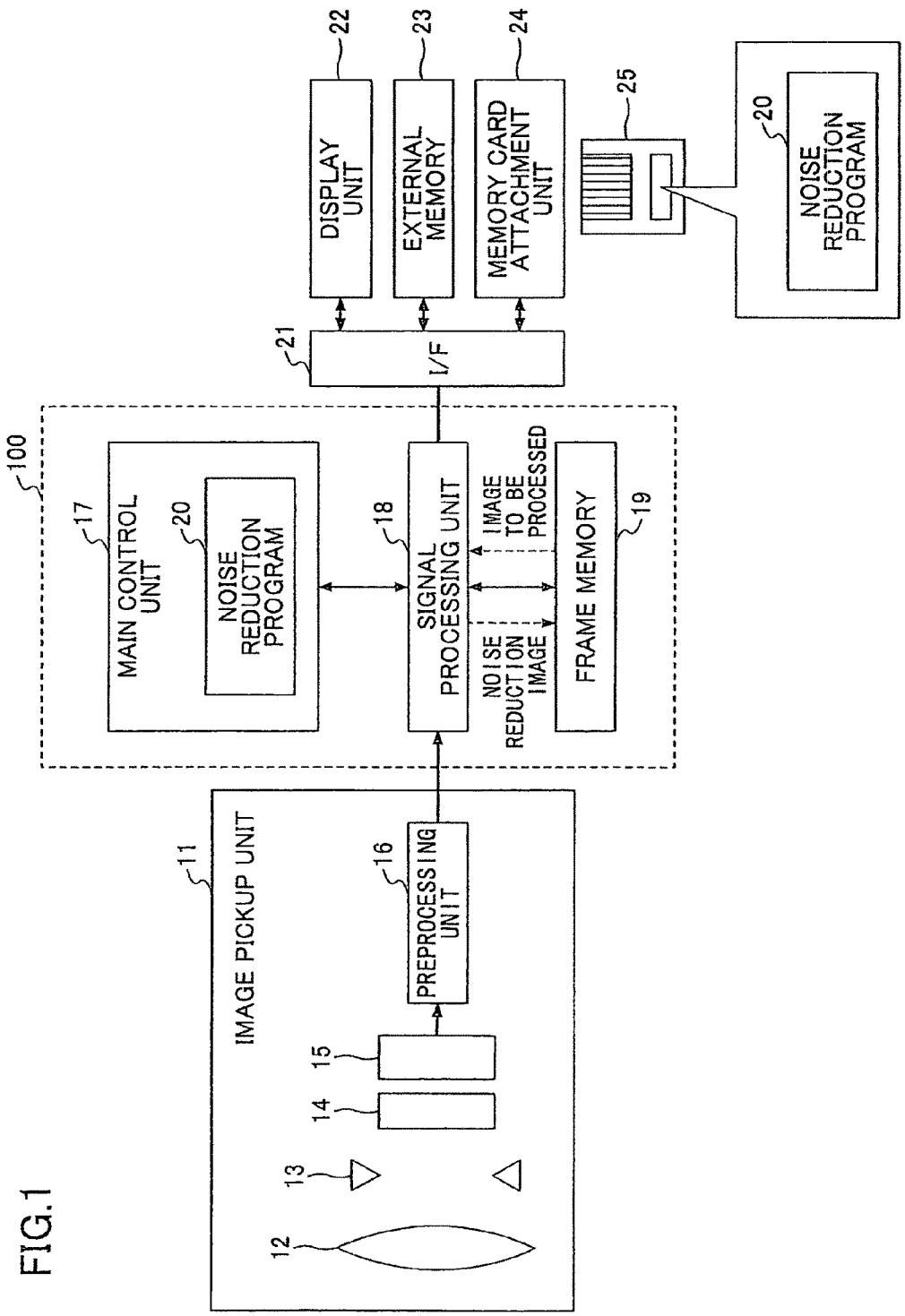
FIG. 1 shows an example of a schematic configuration diagram of a digital camera.

FIG. 1 shows an example of a schematic configuration diagram of a digital camera. The configuration of the digital camera may be of a typical type. The digital camera has, for example, an image pickup unit 11 that picks up images; a signal processing unit 18 that applies processing to image signals acquired from the image pickup unit 11; a main control unit 17 that entirely controls the digital camera; a frame memory 19 that stores image data; and an I/F (interface) 21 to which other components are connected. To the I/F 21 are connected a display unit 22 that displays images; an external memory 23 in/from which image data are stored/read; and a memory card attachment unit 24 to which a storage medium 25 is attached. The noise reduction processing is installed in, for example, the signal processing unit 18 and the main control unit 17, but an example of installing the noise reduction processing is not limited to FIG. 1.

The image pickup unit 11 has a lens 12, an aperture 13, an electronic shutter 14, a photoelectric conversion element 15, and a preprocessing unit 16. As the photoelectric conversion element 15, a CMOS (Complementary Metal Oxide Semiconductor) and a CCD (Charge Coupled Device) are, for example, used. The image pickup unit 11 includes a color filter (in an original color or a complementary color), not shown, and has one photoelectric conversion element 15 for each color of R, G, and B that are arranged, for example, like cells.

The preprocessing unit 16 has an preamplifier, analog signal processing such as AGC (Analog Gain Control), and an A/D converter, and converts analog video signals into digital video signals after applying preprocessing such as amplification and clamp to the analog video signals output from the photoelectric conversion element 15.

The signal processing unit 18 has a DSP or the like and applies various image processing, such as color separation, white balance adjustment, and γ-correction, to digital signals acquired from the image pickup unit 11. The signal processing unit 18 can store processed image data in the frame memory 19. In addition, the signal processing unit 18 can read out stored image data from the frame memory 19 and apply image processing such as noise reduction to them. As the frame memory 19, a semiconductor memory such as a VRAM, a SRAM, and a DRAM is used.

The image data read out from the frame memory 19 are stored in the external memory 23 or the storage medium 25 attached to the memory card attachment unit 24 after being subjected to signal processing such as image compression by the signal processing unit 18. The external memory 23 is a non-volatile memory such as a flash memory, and the storage medium 25 is a portable non-volatile memory to which a USB memory, a SD memory card, and a magneto optical disk can be detachably attached. These memories can be used by switching via the I/F 21. Furthermore, image data may be transmitted to a server by a communication unit, not shown, or may be received from the server and stored in the external memory 23. In this case, the communication unit is connected to mobile phone networks and wired/wireless LAN networks to transmit and receive image data.

The image data read out from the frame memory 19, the external memory 23, or the recording medium 25 are displayed on the display unit 22. The display unit 22 is a liquid crystal display, an organic EL display, or the like, and provided in the housing of the digital camera. The display unit 22 is integrated with a touch panel. Users can perform input operations by using the touch panel and a keyboard provided in the housing.

The main control unit 17 or both of the main control unit 17 and the signal processing unit 18 is composed of a microcomputer, a LSI, etc. Accordingly, for example, the main control unit 17, the signal processing unit 18, and the frame memory 19 are examples of the principle part of the noise reduction device 100. The configuration of the microcomputer is a computer in which a CPU, a RAM, an EEPROM, an ASIC, and the like are mainly connected to one another via a bus. In the microcomputer, the noise reduction processing described below is applied to image data in such a manner that the CPU performs a noise reduction program 20 stored in the EEPROM. Furthermore, hardware such as the ASIC may have the noise reduction processing capability. The noise reduction program 20 is stored in advance in the EEPROM and shipped together with the digital camera. Furthermore, the noise reduction program 20 may be stored in the storage medium 25 so as to be distributed, and read in the EEPROM via the I/F 21. Furthermore, the noise reduction program 20 may be downloaded into the EEPROM via networks.

(Noise Reduction Processing)

Figure 2:
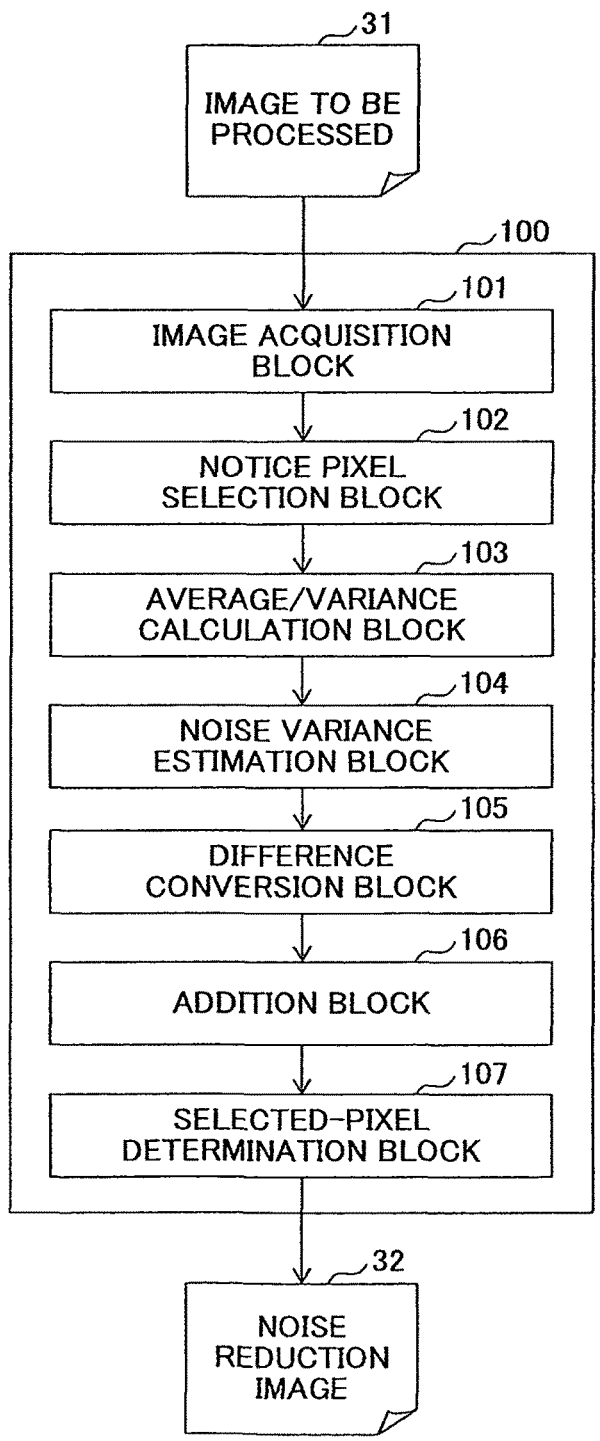
FIG. 2 shows an example of a functional block diagram of a noise reduction device.
Figure 3:
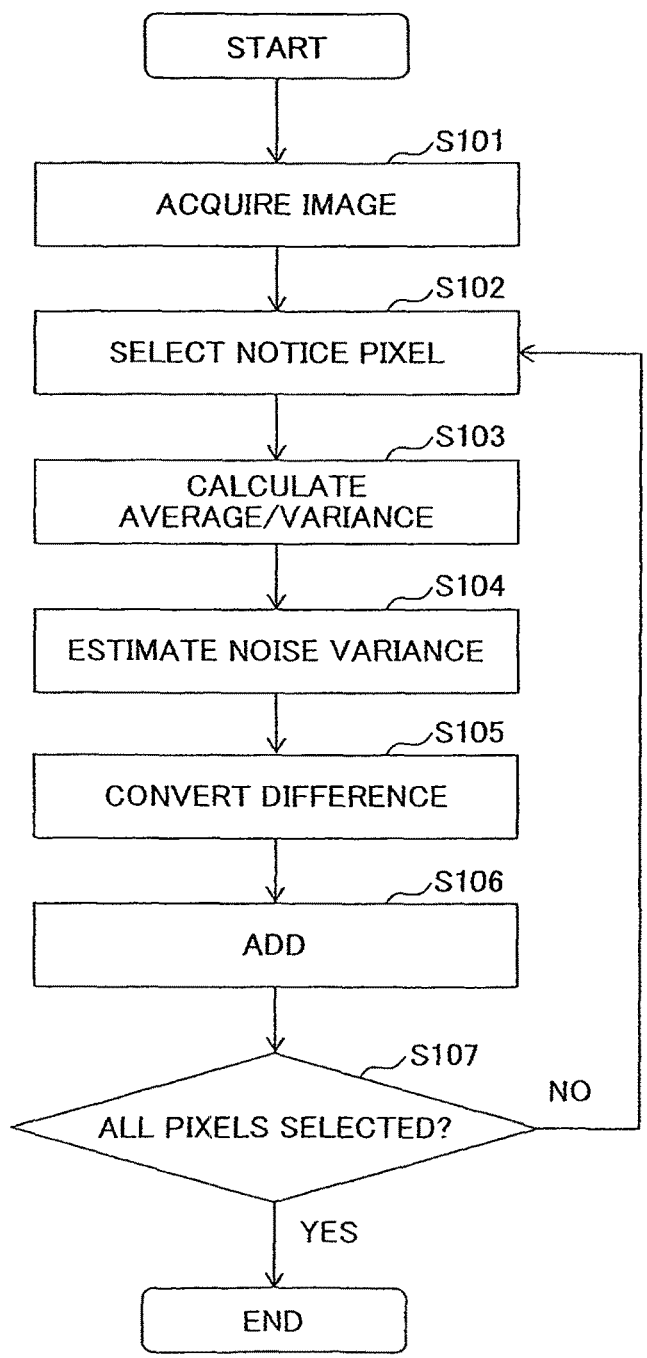
FIG. 3 shows an example of a flowchart for illustrating the procedure of noise reduction processing.

FIG. 2 shows an example of a functional block diagram of the noise reduction device 100, and FIG. 3 shows an example of a flowchart for illustrating the procedure of the noise reduction processing.

The noise reduction device 100 receives image data (hereinafter referred to as an image 31 to be processed) and outputs a noise reduction image 32. The noise reduction device 100 has an image acquisition block 101, a notice pixel selection block 102, an average/variance calculation block 103, a noise variance estimation block 104, a difference conversion block 105, an addition block 106, and a selected-pixel determination block 107. Each of the functional blocks is implemented in such a manner that the CPU performs the noise reduction program 20. Next, each of the functional blocks is described below with reference to the flowchart in FIG. 3.

(S101)

In step S101, the image acquisition block 101 acquires the image 31 to be processed from the frame memory 19. The image 31 to be processed may be image data other than those directly picked up by the digital camera.

(S102)

In step S102, the notice pixel selection block 102 selects a notice pixel from among plural pixels of the image 31 to be processed. For example, raster scanning may be used to successively select the notice pixel. However, any scanning method may be used so long as all the pixels are selected.

(S103)

In step S103, the average/variance calculation block 103 calculates an average and variance of pixel values of pixels of regions neighboring the notice pixel. Here, methods using an ε-filter and a bilateral filter are available. The method described below is an example.

Figure 4:
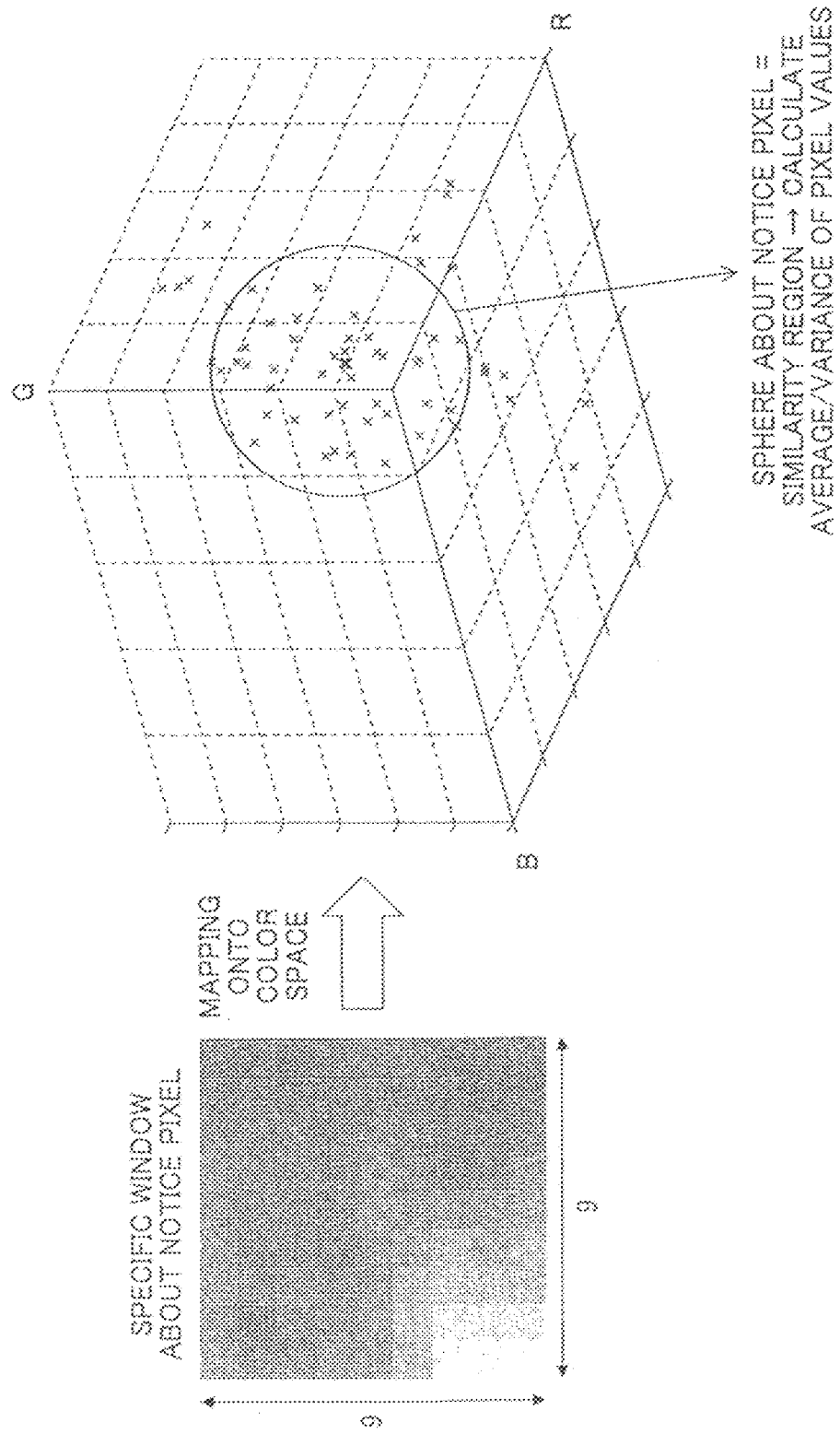
FIG. 4 shows an example of a diagram for schematically illustrating the calculation of an average and variance.

FIG. 4 shows an example of a diagram for schematically illustrating the calculation of the average and the variance. The images neighboring the notice pixel are actually colored. First, the average/variance calculation part 103 selects the pixels about the notice pixel in a specific window. The size of the specific window may be determined in advance or varied in accordance with the strength of the noise reduction processing set by users. In FIG. 4, a rectangle of 9×9 pixels represents the specific window.

Then, the average/variance calculation block 103 calculates a degree of similarity between the notice pixel and each of the neighboring pixels. For example, as the degree of similarity, the reciprocal number of an Euclidean distance in an RGB space may be used. The neighboring pixels having the degree of similarity greater than or equal to a predetermined threshold are used for calculating the average and the variance. This makes it possible to extract the neighboring pixels that approximate the notice pixel in color and reduce noise while preserving an edge. Note that the degree of similarity is calculated for each of the pixels, and the average value is calculated for each of R, G, and B.

In FIG. 4, the pixels about the notice pixel in a sphere represent the neighboring pixels having the degree of similarity greater than or equal to the predetermined threshold to the notice pixel. Hereinafter, a region in the sphere having a specific radius is called a similarity region.

The average/variance calculation block 103 calculates the variance according to the following formulae.

$$\text{Var}(X) = E(X^2) - \{E(X)\}^2 \quad (1)$$

$$\text{Cov}(X,Y) = E(XY) - E(X)E(Y) \quad (2)$$

where Var(X) represents the variance of a random variable X, Cov(X, Y) represents the covariance of random variables X and Y, and E(X) represents the expected value of the random variable X. In other words, the variance and covariance of the pixels of the similarity region can be calculated (filter processing) in such a manner that data obtained by squaring a pixel value, data obtained by multiplying by a pixel value having a different color component, and an original pixel value are combined with each other. Note that instead of calculating the covariance, the covariance may be replaced by 0 from the viewpoint of reducing a processing cost.

Figure 5:
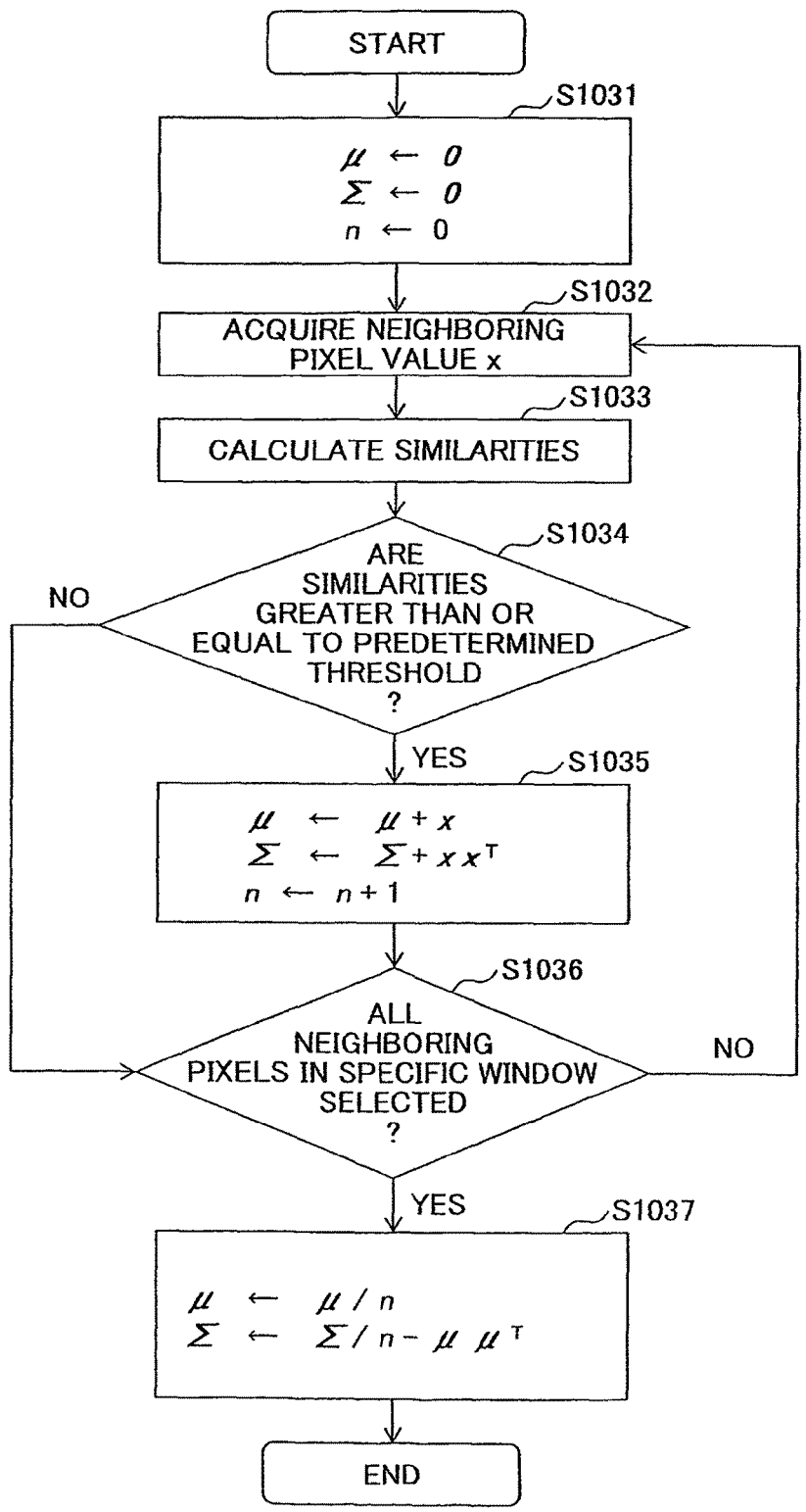
FIG. 5 shows an example of a detailed flow of step S103.

FIG. 5 shows an example of a detailed flow of step S103. x represents the pixel value of the neighboring pixel, indicating a three-dimensional vector having the respective components of R, G, and B as elements. The average/variance calculation block 103 sets zero as a default value to variables $\mu$, $\Sigma$, and n (S1031).

Then, the average/variance calculation block 103 acquires the pixel values of the neighboring pixels in the specific window (S1032) and calculates the degree of similarity to the notice pixel (S1033).

The average/variance calculation block 103 determines whether the degree of similarity is greater than or equal to the predetermined threshold (S1034). If the degree of similarity is greater than or equal to the predetermined threshold (Yes in S1034), the neighboring pixel having the degree of similarity is an object for calculating the average and the variance. Therefore, the average/variance calculation block 103 adds x, $xx^T$, and $n^{+1}$ to the variables $\mu$, $\Sigma$, and n, respectively (S1035). Note that "T" represents transposition.

Next, the average/variance calculation block 103 determines whether all the neighboring pixels in the specific window have been selected (S1036). If all the neighboring pixels in the specific window have not been selected (No in S1035), the flow returns to step S1032 to repeatedly perform the above processing.

If all the neighboring pixels in the specific window have been selected (Yes in S1035), the average/variance calculation block 103 calculates "$\mu/n$" and "$\Sigma/n - \mu\mu^T$" (S1037). The same result as when an average is subtracted from a square sum in general variance calculation can be obtained with a small calculation amount.

As a result of the processing in FIG. 5, $\mu$ is obtained as an average-value vector of the similarity region, and $\Sigma$ is obtained as a variance-covariance matrix. The diagonal component of $\Sigma$ is the variance of the similarity region. Note that instead of an average value of the similarity region, various representative values such as median values and modes may be used. The representative values such as averages may be added with or multiplied by a constant for correcting brightness and white balance.

(Modification of Processing in S103)

The method for calculating the average and the variance in step S103 can be varied. For example, in the first embodiment, the average and the variance of the pixels of the similarity region are simply calculated. However, the average and the variance may be calculated in such a manner that the pixel values of the pixels of the similarity region are weighted. As in the case of a bilateral filter, it is also effective to reflect the degree of similarity and relative position to the notice pixel on the weighting coefficient of a filter. For example, as the degree of similarity is larger, the average/variance calculation block 103 provides the pixel values with larger weighting coefficients to calculate the average and the variance.

Furthermore, in the above embodiment, the Euclidean distance in the RGB space is used for calculating the degree of similarity. However, an Ln-norm (n is a natural number) may be used for calculating the degree of similarity. Furthermore, the color space can be appropriately selected from an L*a*b* color coordinate system, an XYZ color coordinate system, or the like. In this case, the average/variance calculation block 103 converts the pixel values (RGB) of the pixels in the specific window into those of a selected color coordinate system, whereby a conversion formula is of a known one.

The average/variance calculation block 103 can use a norm in a color space different from the RGB space. For example, if a Euclidean norm in an isochromatic space such as L*a*b* is used, the degree of similarity in color close to the perception of human beings can be obtained.

(S104)

Referring back to FIG. 3, in step S104, the noise variance estimation block 104 estimates the variance of noise.

Figure 6:
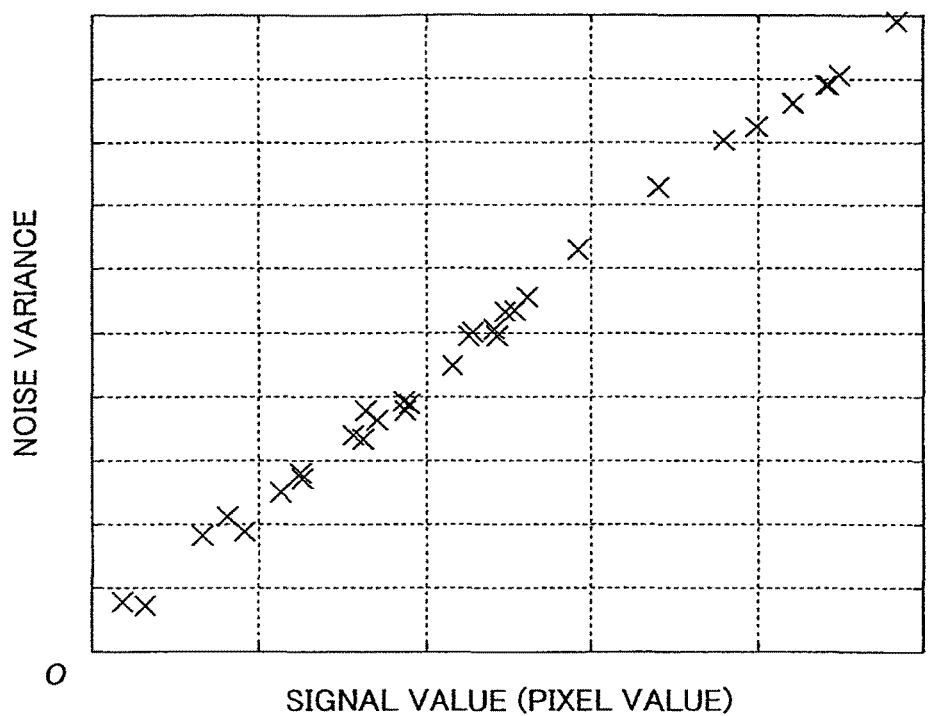
FIG. 6 shows an example of a diagram in which the variances of noise with respect to signal values (pixel values) are plotted.

FIG. 6 shows an example of a diagram in which the variances of noise with respect to signal values (pixel values) are plotted. Shot noise shows a proportional relationship between signal values and the variances of noise. Thus, the variances of noise generally depend on pixel values.

Accordingly, it becomes possible to derive a function for estimating the variance of noise based on pixel values. Note that since the variance of noise is calculated for each component of R, G, and B, the function for estimating the variance of noise is also derived for each component of R, G, and B.

Figure 7:
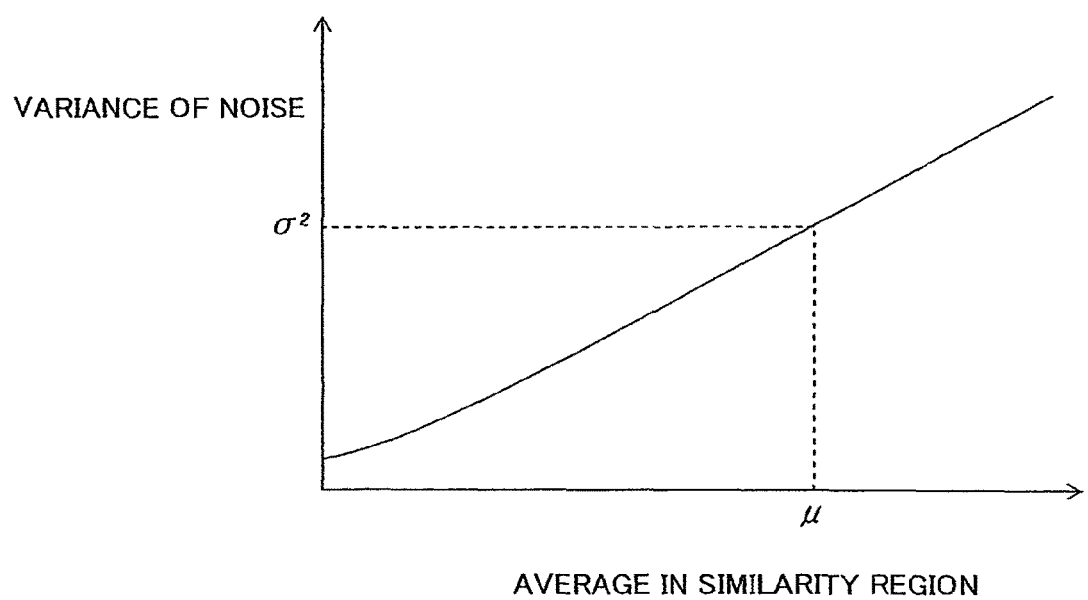
FIG. 7 shows an example of a function for estimating the variance of noise.

In order to reduce noise in the notice pixel, average noise contained in the notice pixel is desired. Therefore, the noise variance estimation block 104 finds the variance of the noise of the similarity region. FIG. 7 shows an example of the function for estimating the variance of the noise of the similarity region. The noise variance estimation block 104 finds the variance $\sigma 2$ of the noise of the similarity region by using the function shown in FIG. 7 based on each component of the average-value vector $\mu$.

This is applied to each color component to find the variance of the noise of each component. The matrix in which the diagonal component is replaced by the found variance of the noise is used as a variance-covariance matrix $\Sigma_{noise}$. In many cases, the non-diagonal component (covariance) of the variance-covariance matrix can be replaced by 0. If the covariance of the noise cannot be ignored, the estimation function of the covariance is identified in the same manner as a variance estimation function. The covariance is estimated by the use of the estimated function of the covariance to calculate the variance-covariance matrix.

(S105)

Referring back to FIG. 3, in step S105, the difference conversion block 105 subtracts the average-value vector $\mu$ of the similarity region from the notice pixel vector g of the notice pixel g and converts the direction and the size of an obtained difference (hereinafter referred to as a difference vector s).

Figure 8A:
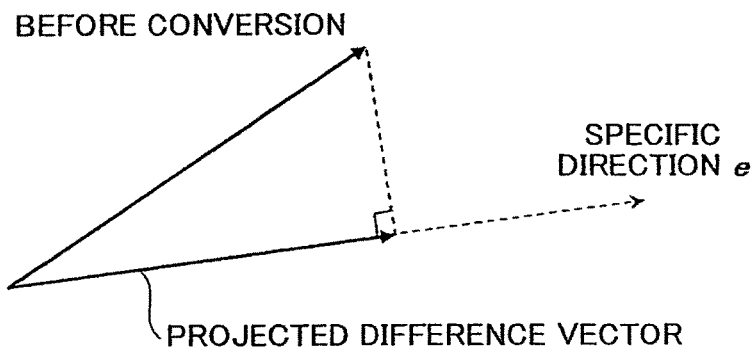
FIGS. 8A and 8B show examples of diagrams for schematically illustrating the conversion of a difference vector s.
Figure 8B:
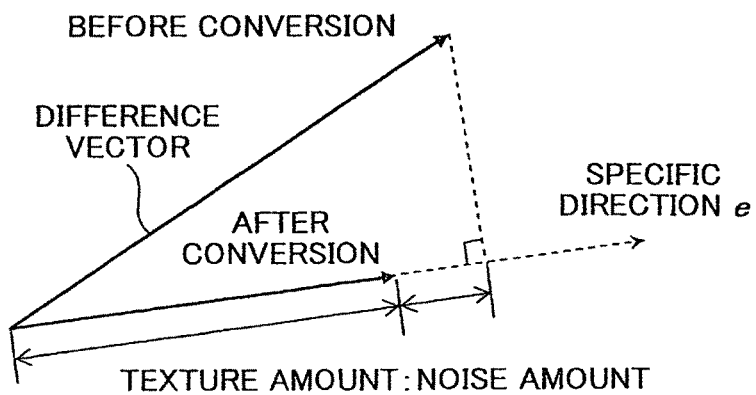

FIGS. 8A and 8B show examples of diagrams for schematically illustrating the conversion of the difference vector s. As shown in FIG. 8A, the difference conversion block 105 first projects the difference vector s in a specific direction e. The specific direction e can be a constant direction (hereinafter referred to as a constant RGB ratio direction) having the same RGB ratio as the components (R, G, and B) of the average-value vector $\mu$ of the similarity region. With this specific direction e, it is possible to prevent the pixel value of the notice pixel from being different from the color of the similarity region. In addition, the difference vector s is converted in the direction of the color of the similarity region and reduced in size when being projected, which in turn reduces noise causing a color different from those of the pixels of the similarity region and the magnitude of the noise.

More preferably, the difference conversion block 105 applies processing for explicitly reducing noise to the projected difference vector s by using the variance-covariance matrix $\Sigma_{noise}$ of the noise of the similarity region. As shown in FIG. 8B, the difference conversion block 105 multiplies the size of the projected vector by a value of (a texture amount)/(a noise amount+the texture amount). Accordingly, the strength of noise reduction can adaptively be controlled in accordance with the noise amount and the texture amount.

Note that the noise amount is variance in the specific direction e in the variance-covariance matrix $\Sigma_{noise}$ of noise, and the texture amount is variance in the specific direction e of the variance-covariance matrix $\Sigma_{noise}$ obtained by subtracting the variance-covariance matrix $\Sigma_{noise}$ of the noise from the variance-covariance matrix of the similarity region. Generally, when the variance-covariance matrix is $\Sigma$, variance $\sigma e^2$ in the specific direction e (unit vector) can be found by the following formula.

$$\sigma_e^2 = e^T \Sigma e \quad (3)$$

Since the texture amount is obtained by subtracting the variance-covariance matrix $\Sigma_{noise}$ of the noise from the variance-covariance matrix of the similarity region, it is substantially required to multiply the size of the projected difference vector s by (the texture amount)/(the noise amount+the texture amount)={1−(the size of the variance of the noise in the e direction)/(the size of the variance of the similarity region in the e direction)}.

FIG. 9 shows an example of a detailed flow of step S105. A procedure in FIG. 9 is only an exemplification. Thus, the contents and orders of processing steps can be replaced with each other so long as they provide the same results. The notice pixel vector g is the pixel value of the notice pixel (vector of R, G, and B), and $\Sigma_{total}$ is the same as $\Sigma$ in step S1035, indicating the variance-covariance matrix of the similarity region.

First, the difference conversion block 105 calculates the difference vector s (S1051).

$$s \leftarrow g - \mu$$

Then, the difference conversion block 105 projects the difference vector s in the specific direction e (S1052).

$$s \leftarrow ee^T s$$

Next, the difference conversion block 105 finds the size of the variance-covariance matrix $\Sigma_{noise}$ of the noise in the specific direction e and the size of the variance-covariance matrix $\Sigma_{total}$ of the similarity region in the specific direction e, and subtracts a ratio of the both from 1 to calculate a weight w (S1053). In other words, non-additive noise can be reduced.

$$w \leftarrow 1 - (e^T \Sigma_{noise} e)/(e^T \Sigma_{total} e)$$

The difference conversion block 105 converts the size of the projected difference vector s (S1054).

$$s \leftarrow ws$$

With the above processing, the strength of noise reduction can adaptively be controlled in accordance with the noise amount and the texture amount without damaging the color.

(Modification of Processing in S105)

Instead of projecting the difference vector s in the constant RGB ratio direction, it is also useful to project the different vector s in a brightness direction. In this case, there is a likelihood of slightly changing a color. However, since the brightness direction is constant in the RGB space, the specific direction e becomes constant without relying on each similarity region (i.e., the notice pixel), which in turn achieves accelerated processing. There is a relationship "brightness=0.299R+0.587G+0.114B" between brightness and RGB. Therefore, for example, the direction passing through (0.3 0.6 0.1) and an origin is the specific direction e.

Furthermore, if the coefficient multiplied by the projected vector has the characteristic of decreasing as a noise amount increases and increasing as a texture amount increases, noise can be more efficiently reduced. For example, using any constants α and β, "α×(a noise amount)/(the noise amount+a texture amount)+β" is assumed. If α and β are greater than or equal to 1, the weight w can be made smaller, which in turn greatly reduces noise. If α and β are smaller than 1, the weight w can be made greater, which in turn easily preserves a texture and an edge. Using α and β as parameters, designers can perform settings so as to suit desired image quality.

(S106)

Referring back to FIG. 3, in step S106, the addition block 106 adds the converted difference vector s to the average-value vector μ of the similarity region. When the difference vector s is projected and added to the average-value vector μ, a high frequency to be eliminated in filter processing is added, which makes it possible to preserve a signal component having a small amplitude. Note that as described in a second embodiment, it is also possible to first calculate a linear-conversion matrix the same in contents as FIG. 9 and multiply it by the average-value vector μ. The addition block 106 replaces the pixel value of the notice pixel based on the vector element RGB obtained by the addition.

(S107)

In step S107, the selected-pixel determination block 107 determines whether all the pixels of the image 31 to be processed have been selected. If any non-selected pixel exists, the flow proceeds to step S102. If all the pixels have been selected, the noise reduction device 100 outputs a noise reduction image 32. The noise reduction image 32 is temporarily stored in, for example, the frame memory 19, and then stored in the external memory 23 or the storage medium 24.

(Noise Reduction of Images in Colors Other than R, G, and B)

The noise reduction method of this embodiment can suitably be applied to images in colors other than R, G, and B. In the case of the images in colors other than R, G, and B, it is required to additionally provide a processing unit for converting a color space into R, G, and B at a stage prior to the noise reduction device 100 and provide a processing unit for restoring the color space to the original color space from R, G, and B at a stage subsequent to the noise reduction device 100. A formula for converting the color space is of a known one.

Alternatively, it is also possible to input the image 31 to be processed to the noise reduction device 100 without subjecting color conversion to the image 31. In this case, the color conversion is partially performed only in the processing steps (step S103 for calculating the degree of similarity and step S105 for projecting the difference vector s in the specific direction) where the conversion of the color space is required.

(Execution on Bayer Array)

When images in color are picked up, a Bayer array filter that expresses brightness in red, blue, and green for each photoelectric conversion element 15 is frequently used. The embodiment of the present invention can also be applied to the image 31 to be processed, which is picked up by such a Bayer array filter.

For example, it is possible to provide a circuit for interpolating (synchronizing) data of the Bayer array into RGB data in the preprocessing unit 16 of the noise reduction device 100 and provide a processing unit for thinning out the RGB data onto the Bayer array at a stage subsequent to the noise reduction device 100. Furthermore, it is also possible to directly input the data of the Bayer array to the noise reduction device 100 and temporarily perform RGB interpolation (synchronization) only at a part where RGB is required for one pixel (S103 and S105).

As described above, since the noise reduction device 100 of this embodiment restricts pixel value variations due to the noise reduction processing in the specific direction e of the color space, color noise can be effectively reduced without causing color shifts. In addition, since the strength of noise reduction is varied in accordance with a noise amount and a texture amount, non-additive noise whose intensity depends on a signal value can be properly reduced in consideration of the texture amount of an original image.

Second Embodiment

In the first embodiment, the difference vector s is projected in the specific direction e and added to the average-value vector μ of the similarity region. In this embodiment, when an average constant RGB ratio direction of the similarity region is used as the specific direction e, the specific direction e is the same as the direction of the average-value vector μ of the pixels of the similarity region.

Figure 10A:
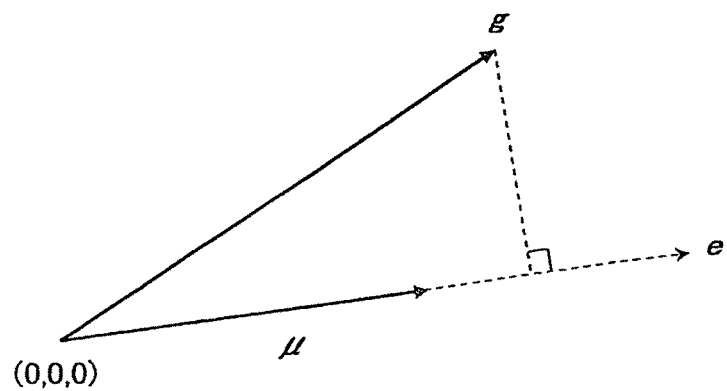
FIGS. 10A and 10B show a relationship between a specific direction e and a constant RGB ratio direction of an average value of a similarity region.

FIG. 10A shows a relationship between the specific direction e and the constant RGB ratio direction. In other words, the direction of the average-value vector μ coincides with the specific direction e. Accordingly, the processing of projecting the difference vector s in the constant RGB ratio direction and adding the same to the average-value vector μ of the pixels of the similarity region is equivalent to the processing of multiplying the average-value vector μ by a scalar.

Based on this fact, this embodiment refers to the noise reduction device 100 that substitutes the processing steps of S105 and S106 in FIG. 3 with processing of finding a proper multiplication number η and processing of multiplying the average-value vector μ of the pixels of the similarity region by the multiplication number η as a scalar, respectively.

Figure 11:
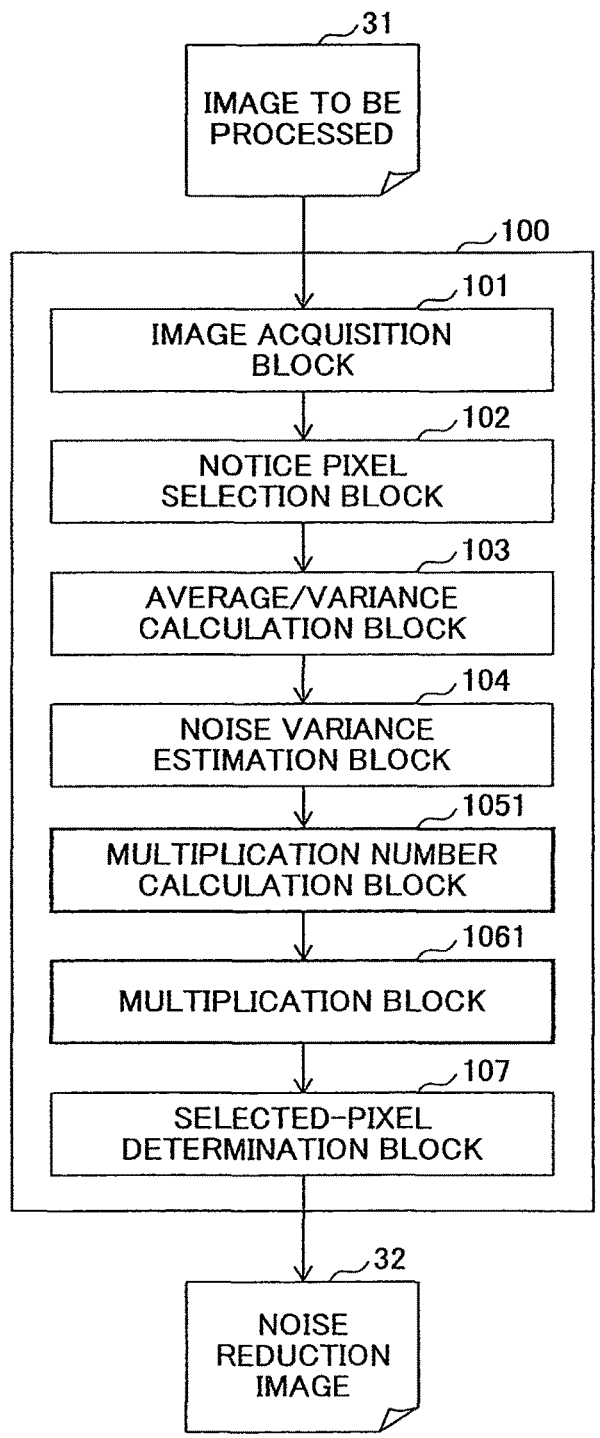
FIG. 11 shows an example of a functional block diagram of the noise reduction device (Second Embodiment)
Figure 12:
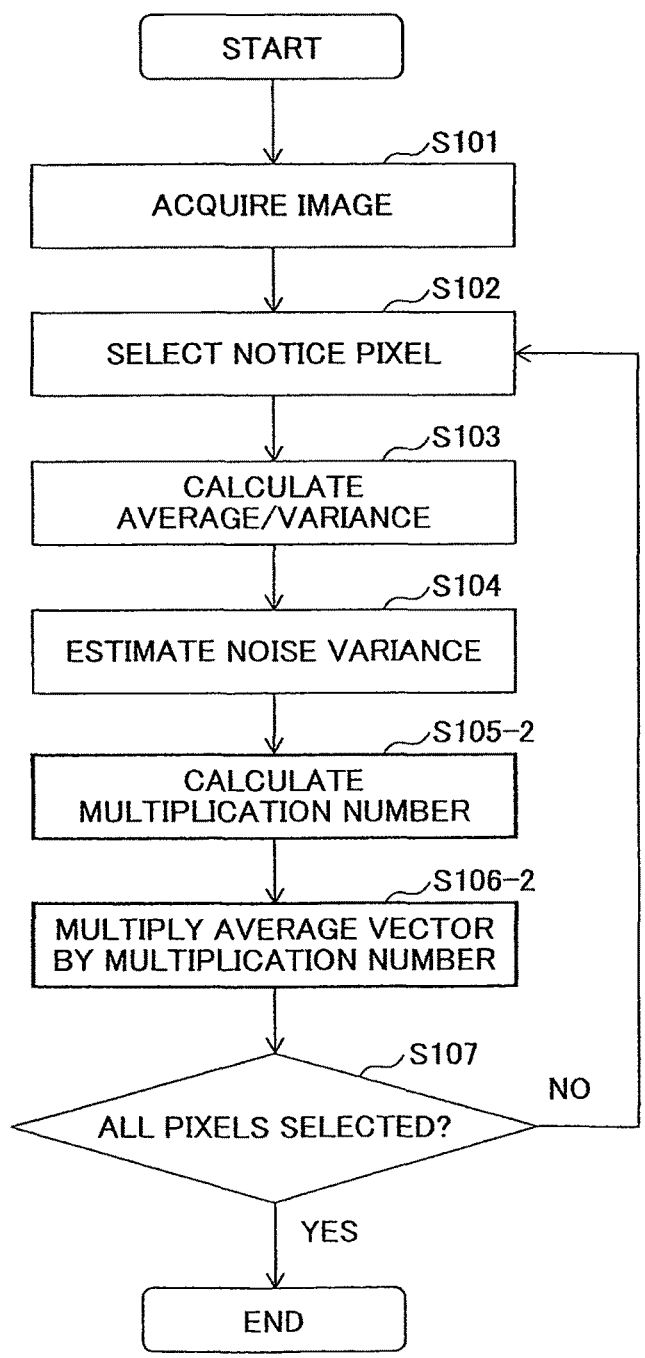
FIG. 12 shows an example of a flowchart for illustrating the procedure of the noise reduction processing (Second Embodiment)

FIG. 11 shows an example of a functional block diagram of the noise reduction device 100, and FIG. 12 shows an example of a flowchart for illustrating the procedure of the noise reduction processing. Note that in FIG. 11, parts the same as those of FIG. 2 are denoted by the same reference numerals and their descriptions are omitted. Furthermore, in FIG. 12, parts the same as those of FIG. 3 are denoted by the same reference numerals and their descriptions are omitted.

(S105-2)

In step S105-2, a multiplication number calculation block 1051 calculates the multiplication number η. The following formulae can be used for calculating the multiplication number η.

$$\eta = v + (1-v)\frac{\mu^T g}{|\mu^2|} \quad (4)$$

$$v = \frac{\mu^T \sum_{noise} \mu}{\mu^T \sum_{total} \mu} \quad (5)$$

where the average-value vector μ represents the constant RGB ratio direction, g represents the vector of the notice pixel, $\Sigma_{noise}$ represents the variance-covariance matrix $\Sigma_{noise}$ of noise, and $\Sigma_{total}$ represents the variance-covariance matrix $\Sigma_{total}$ of the similarity region. Since this can be derived by converting the formula with e=μ/|μ| in the above example, the same processing result is obtained. The processing of this embodiment is advantageous because its processing cost is low.

(S106-2)

In step S106-2, a multiplication block 1061 multiplies the average-value vector μ by the multiplication number η as the scalar.

Figure 10B:
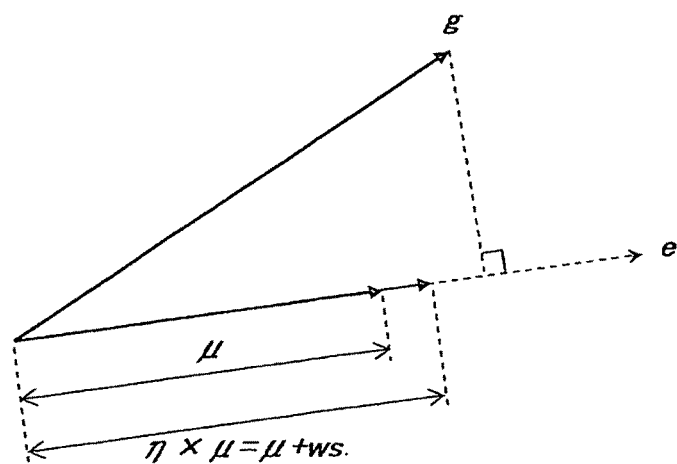

FIG. 10B shows an average (vector of RGB) of the similarity region after the multiplication. When the constant RGB ratio direction of the similarity region before the multiplication is multiplied by the multiplication number η, μ←η×μ is obtained, indicating that μ after the multiplication is equivalent to "μ+s" of the first embodiment.

The noise reduction device 100 of this embodiment can obtain the same effect as that of the first embodiment at a lower processing cost.

Equivalence Between First and Second Embodiments

In the second embodiment, it is described that when the constant RGB ratio direction is used as the specific direction e, the multiplication of the average-value vector μ of the similarity region by the multiplication number η is equivalent to the processing of projecting the difference vector s in the specific direction e and adding the same to the average-value vector μ of the similarity region. A reason for this equivalency between them is described below.

The processing of the first embodiment can be expressed by the following formula.

$$f = \mu + (1-v)\frac{\mu\mu^T}{|\mu|^2}(g-\mu) \quad (6)$$

The formula (6) represents the processing of linearly converting the difference vector "g–μ" and adding the same to μ. Note that v is explained in the formula (5).

The right side of the formula (6) can be converted as follows.

$$\text{RIGHT SIDE OF FORMULA (6)} = v\mu + (1-v)\frac{\mu\mu^T}{|\mu|^2}g \quad (7)$$

$$= \left\{v + (1-v)\frac{\mu^T g}{|\mu|^2}\right\}\mu$$

In the formula (7), μ is multiplied by a coefficient. Furthermore, a variable in curly brackets in the formula (7) is the same as the multiplication number η in the formula (4). Accordingly, when the specific direction e is used as the constant RGB ratio direction, the processing of projecting the difference vector s in the specific direction e and adding the same to the average-value vector μ of the similarity region is equivalent to the processing of multiplying the average μ of the similarity region by η. Accordingly, the first embodiment is equivalent to the second embodiment.

Third Embodiment

This embodiment refers to the noise reduction device 100 that projects the difference vector s in the maximum variance direction of the pixels of the similarity region to reduce noise.

Figure 13:
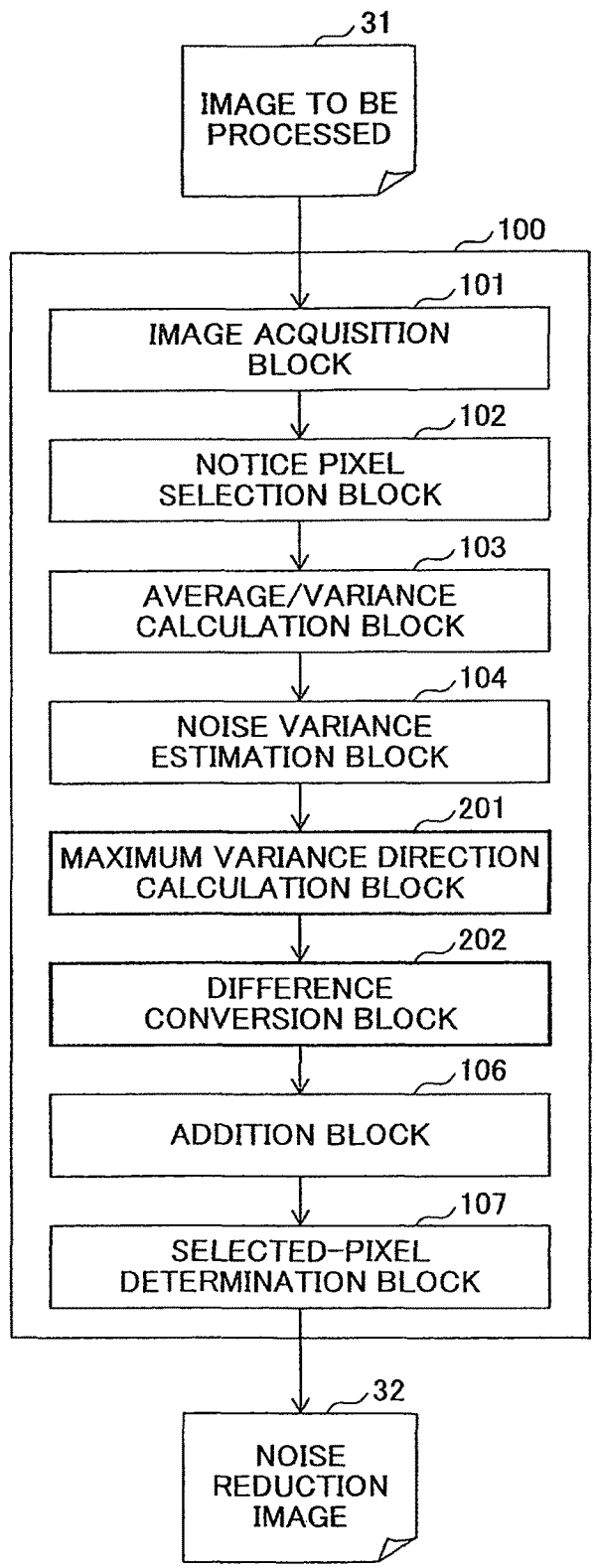
FIG. 13 shows an example of a functional block diagram of the noise reduction device (Third Embodiment)

FIG. 13 shows an example of a functional block diagram of the noise reduction device 100 of this embodiment. Note that in FIG. 13, parts the same as those of FIG. 2 are denoted by the same reference numerals and their descriptions are omitted. The functional block diagram of FIG. 13 is different from that of FIG. 2 in that it has a maximum variance direction calculation block 201. Furthermore, the difference conversion block 202 operates in a way different from the difference conversion block 105 of the first embodiment.

Figure 14:
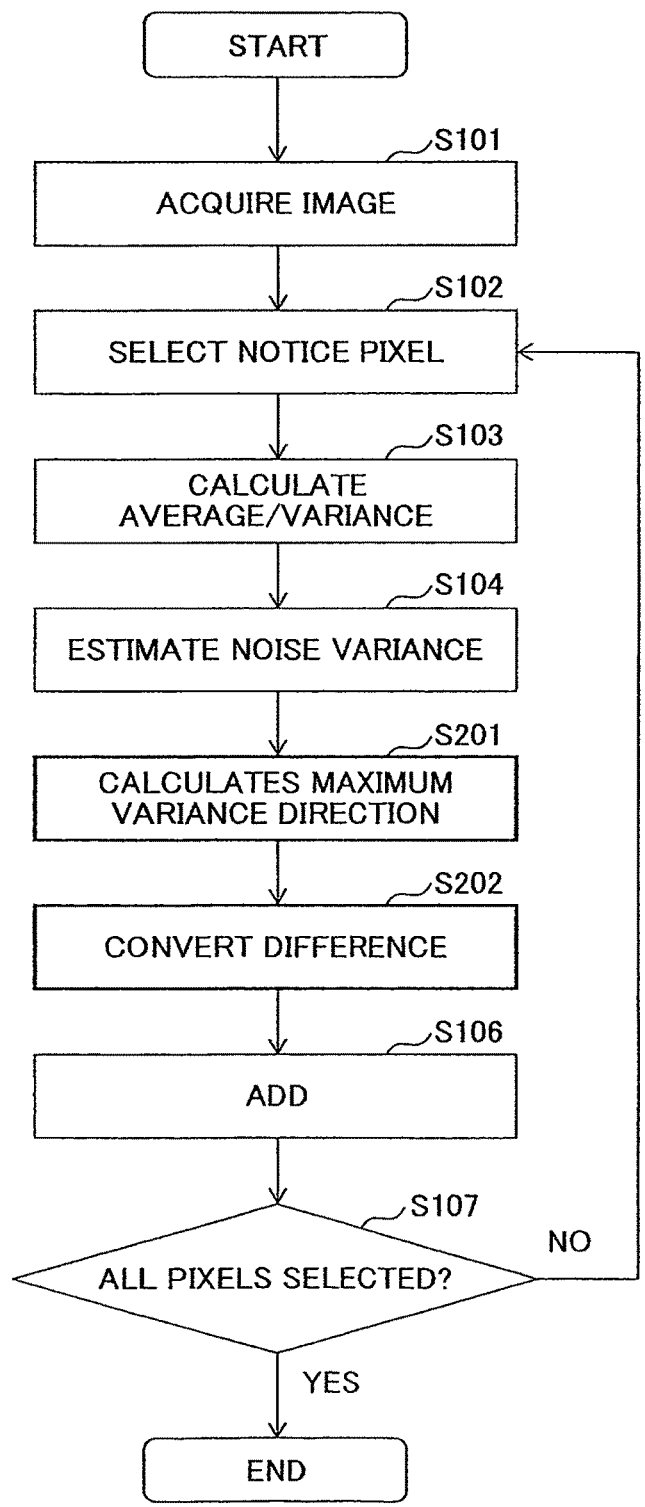
FIG. 14 shows an example of a flowchart for illustrating the procedure of the noise reduction processing (Third Embodiment)

FIG. 14 shows an example of a flowchart for illustrating the procedure of the noise reduction processing. In FIG. 14, steps the same as those FIG. 3 are denoted by the same reference numerals and their descriptions are omitted.

(S201)

By the processing steps of S101 through S S104, the average-value vector μ, $\Sigma_{total}$, and $\Sigma_{noise}$ of the similarity region are calculated. In step S201, the maximum variance direction calculation block 201 calculates the maximum variance directions of the original pixel value of the pixels of the similarity region in the color space. Specifically, this calculation is performed according to the following procedure.

Figure 15:
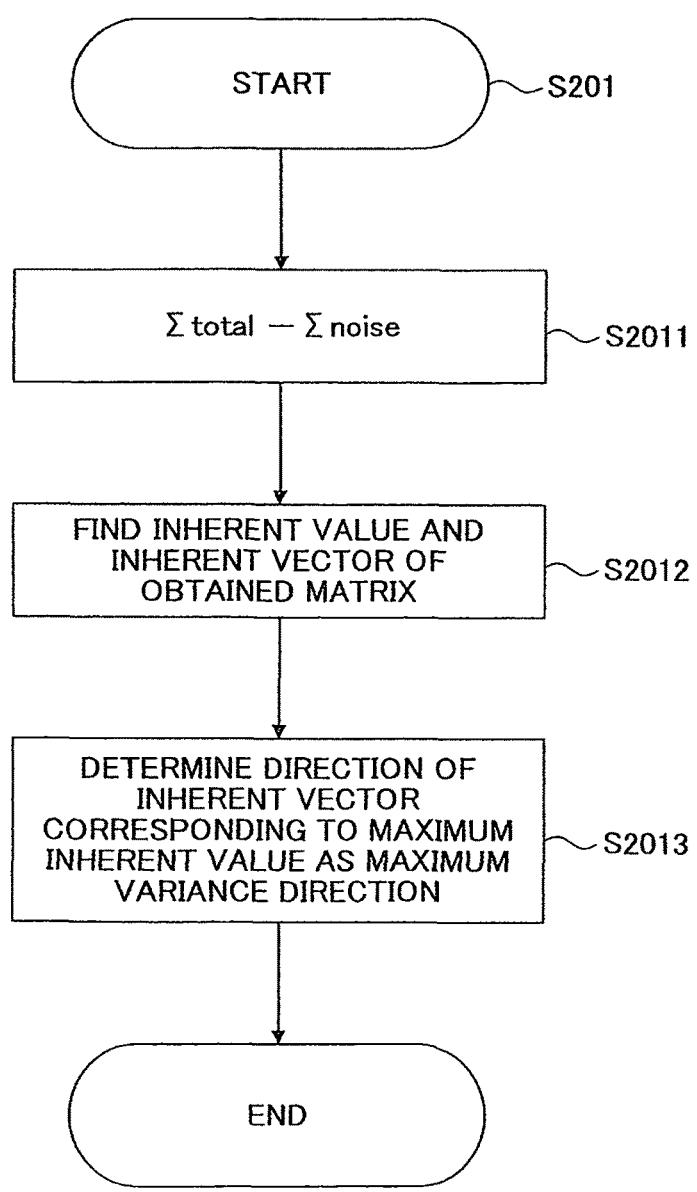
FIG. 15 shows an example of a detailed flow of step S201.

FIG. 15 shows an example of a detailed flow of step S201.

First, the maximum variance direction calculation block 201 subtracts the variance-covariance matrix $\Sigma_{noise}$ of noise from the variance-covariance matrix $\Sigma_{total}$ of the pixels of the similarity region (S2011).

$$\Sigma_{total} - \Sigma_{noise}$$

The maximum variance direction calculation block 201 finds the inherent value and the inherent vector of the obtained matrix (S2012). The inherent vector of the variance-covariance matrix indicates which direction the variance of given data is oriented. Furthermore, the inherent value indicates what extent the variance is spread in the direction, i.e., how much the variance is varied. Accordingly, the maximum variance direction is obtained by finding the inherent vector in which the inherent value of the variance-covariance matrix becomes the maximum (S2013).

(S202)

In step S202, the difference conversion block 202 performs the same processing as that of the first embodiment using the maximum variance direction as the specific direction e. In other words, the difference conversion block 202 subtracts the average-value vector μ of the similarity region from the vector g of the notice pixel and projects the obtained difference vector s in the maximum variance direction. Then, the difference conversion block 202 applies the processing of reducing noise to the projected difference vector s by using the variance-covariance matrix $\Sigma_{total}$ of the similarity region.

Accordingly, with the projection of the difference vector s in the maximum variance direction, the quality of original images can be more strongly reflected unlike the cases of using the constant RGB ratio direction and the brightness direction. Furthermore, degradation of minute signals due to noise reduction can be reduced. Moreover, an edge can be easily preserved.

Fourth Embodiment

This embodiment refers to the noise reduction device 100 that uses a space frequency rather than the variance-covariance matrix of pixel values to calculate a noise amount and a texture amount.

Figure 16:
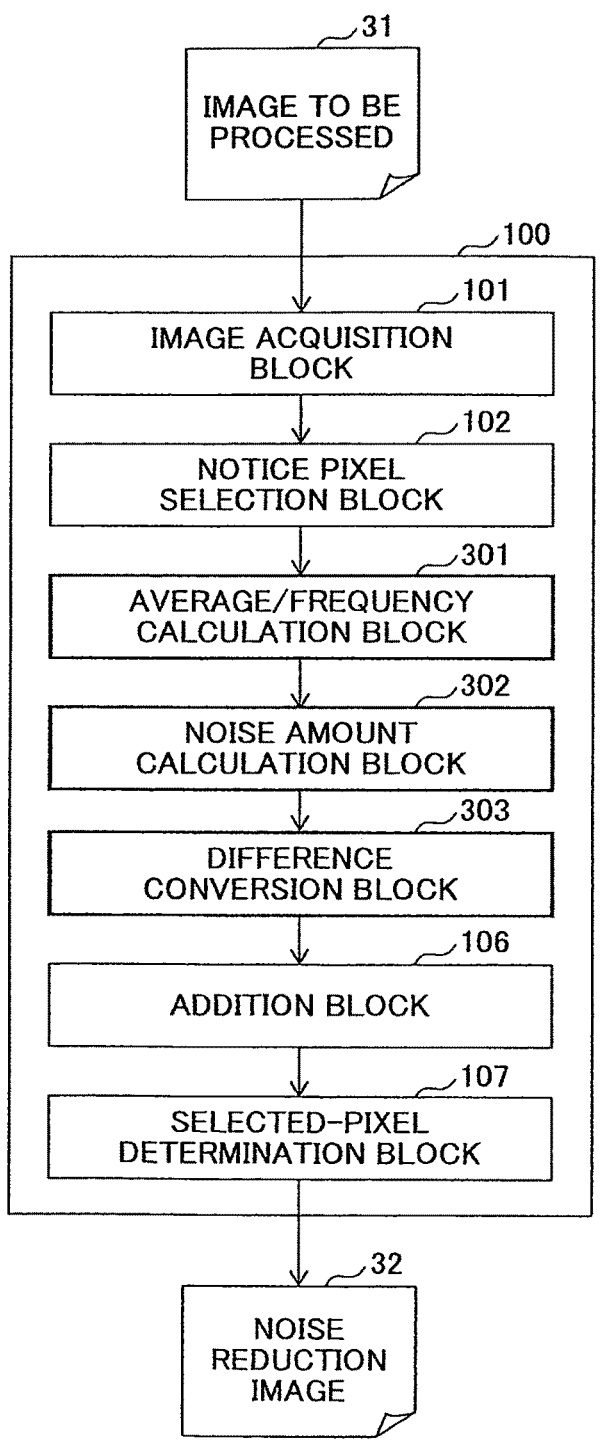
FIG. 16 shows an example of a functional block diagram of the noise reduction device (Fourth Embodiment)

FIG. 16 shows an example of a functional block diagram of this embodiment. In FIG. 16, parts the same as those of FIG. 2 are denoted by the same reference numerals and their descriptions are omitted. The functional block diagram of FIG. 16 has an average/frequency calculation block 301 instead of the average/variance calculation block 103 and a noise amount calculation block 302 instead of the noise variance estimation block 104. Furthermore, a difference conversion block 303 provides the same function as that of the difference conversion block 105.

Figure 17:
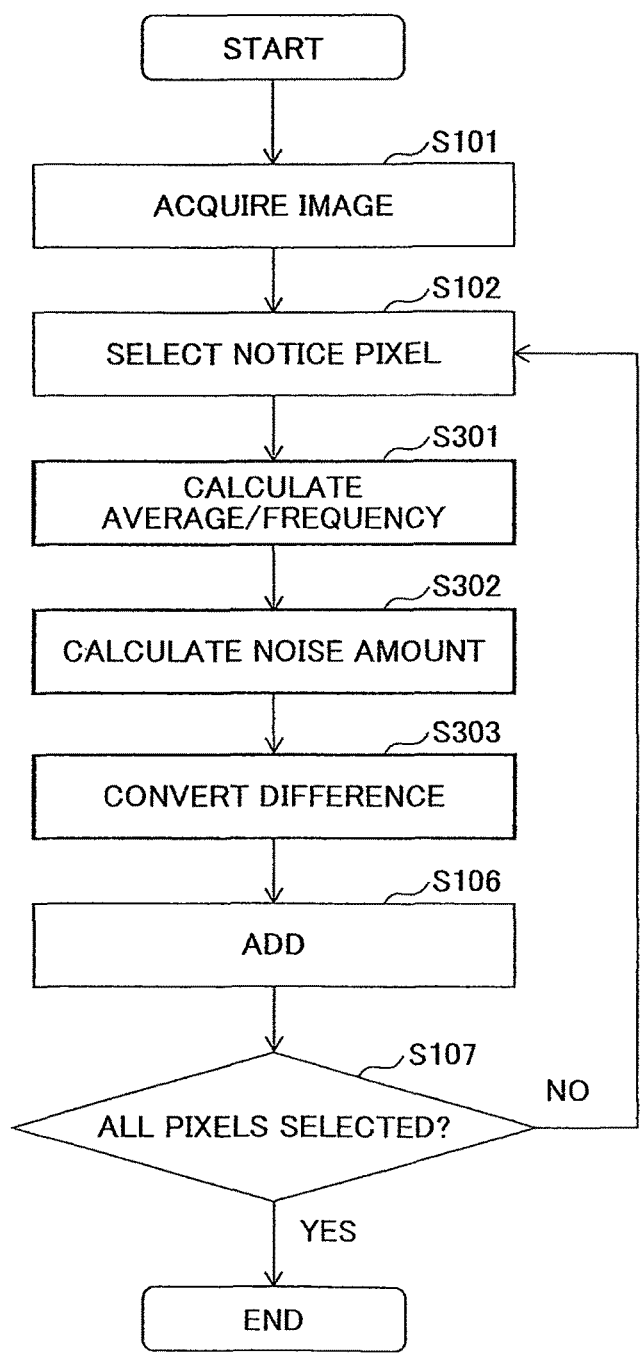
FIG. 17 shows an example of a flowchart for illustrating the procedure of the noise reduction processing (Fourth Embodiment)

FIG. 17 shows an example of a flowchart for illustrating the procedure of the noise reduction processing. In FIG. 17, steps the same as those of FIG. 3 are denoted by the same reference numerals and their descriptions are omitted.

(S301)

In step S301, the average/frequency calculation block 301 calculates the average-value vector μ of the pixels of the similarity region and a vector having strength of a specific frequency. A method for calculating the average is the same as that of the first embodiment, and therefore its description is omitted. In order to calculate the vector having the strength of the specific frequency, the average/frequency calculation block 301 finds the strength of the specific frequency of the pixels of the similarity region in accordance with the filter response of each color (RGB) component.

Figure 18:
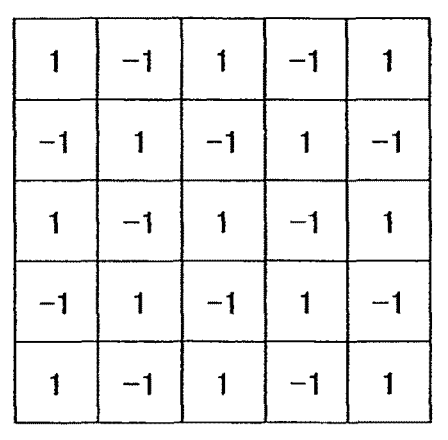

FIG. 18 shows an example of a filter having a size of 5×5 pixels. Note that only the pixels used for calculating the average are used for filter calculation. By the adjustment of the filter to be used, a desired frequency component can be extracted from the image 31 to be processed. For example, known filters are of a type that extract an edge and a type that smoothens an edge. The filter shown in FIG. 18 is an example that extracts a high frequency component.

It is known that noise contained in the image 31 to be processed possibly depends on a space frequency. When noise is estimated from the average of the pixel values as in the case of the first embodiment, the noise must be estimated from all the frequency components of the image 31 to be processed. Therefore, noise reduction may not be properly performed depending on a frequency component.

On the contrary, the method for adjusting the strength using the space frequency includes both adjusting noise reduction strength so as to correspond to the frequency of noise desired to be reduced and adjusting the same so as to correspond to the frequency of a texture desired to be left. In other words, a noise amount and a texture amount in a frequency band can be reflected on the noise reduction strength. While the estimation of noise according to the variance targets at the whole frequency band, the method of this embodiment can target at a specific frequency band. Accordingly, the noise reduction processing can be effectively performed when a noise amount and a texture amount in a specific frequency band are only required to be reflected on the noise reduction strength.

(S302)

In step S302, the noise amount calculation block 302 calculates the strength of noise. In order to calculate the strength of noise, a function for returning the strength of the specific frequency of the noise is identified in advance from the average of the pixels of the similarity region. This function is the same as that of FIG. 7, and therefore its description is omitted. This function is applied to each color component to find the vector having the strength of the specific frequency of the noise.

(S303)

In step S303, the difference conversion block 303 converts the difference vector s. The following procedure is the same as that of FIG. 1. The difference conversion block 303 projects the difference vector s in the specific direction e to change its size. As the specific direction e, the constant RGB ratio direction, the brightness direction, the maximum variance direction, etc., can be used.

The difference conversion block 303 identifies as the noise amount the size of the vector obtained when the vector having the strength of the specific frequency of the noise is projected in the specific direction e. Furthermore, the difference conversion block 303 identifies as the texture amount the size of the vector obtained when the vector having the strength of the specific frequency of the noise is subtracted from the difference vector s projected in the specific direction e. Using the noise amount and the texture amount thus obtained, the difference conversion block 303 changes the size of the projected vector of the difference vectors like, for example, step S1053. Note that when the specific direction e is used as the constant RGB ratio direction, the average-value vector μ of the similarity region may be multiplied by η as in the case of the second embodiment.

Accordingly, since the noise reduction device 100 of this embodiment extracts the component of the specific frequency to calculate the strength of the noise with the filter, noise having a desired frequency component can be easily reduced.

Fifth Embodiment

In the above embodiments, the difference vector s is projected in the specific direction e so as to be converted. However, this embodiment refers to the noise reduction device 100 that converts the difference vector s in accordance with noise amounts in the specific direction e and a direction perpendicular to the specific direction e. In other words, the difference vector s is converted in the two-dimensional sub-space of the RGB space.

Figure 19:
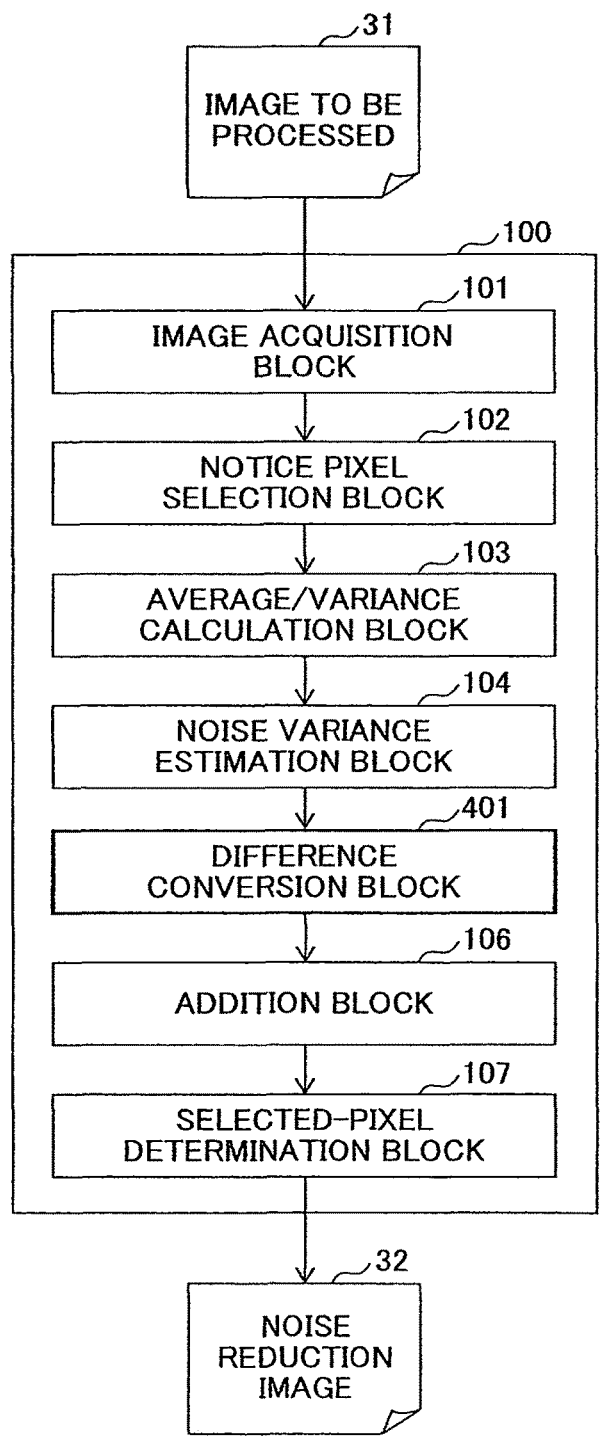
FIG. 19 shows an example of a functional block diagram of the noise reduction device (Fifth Embodiment)

FIG. 19 shows an example of a functional block diagram of this embodiment. In FIG. 19, parts the same as those of FIG. 2 are denoted by the same reference numerals and their descriptions are omitted. The functional block diagram of FIG. 19 has a difference conversion block 401.

Figure 20:
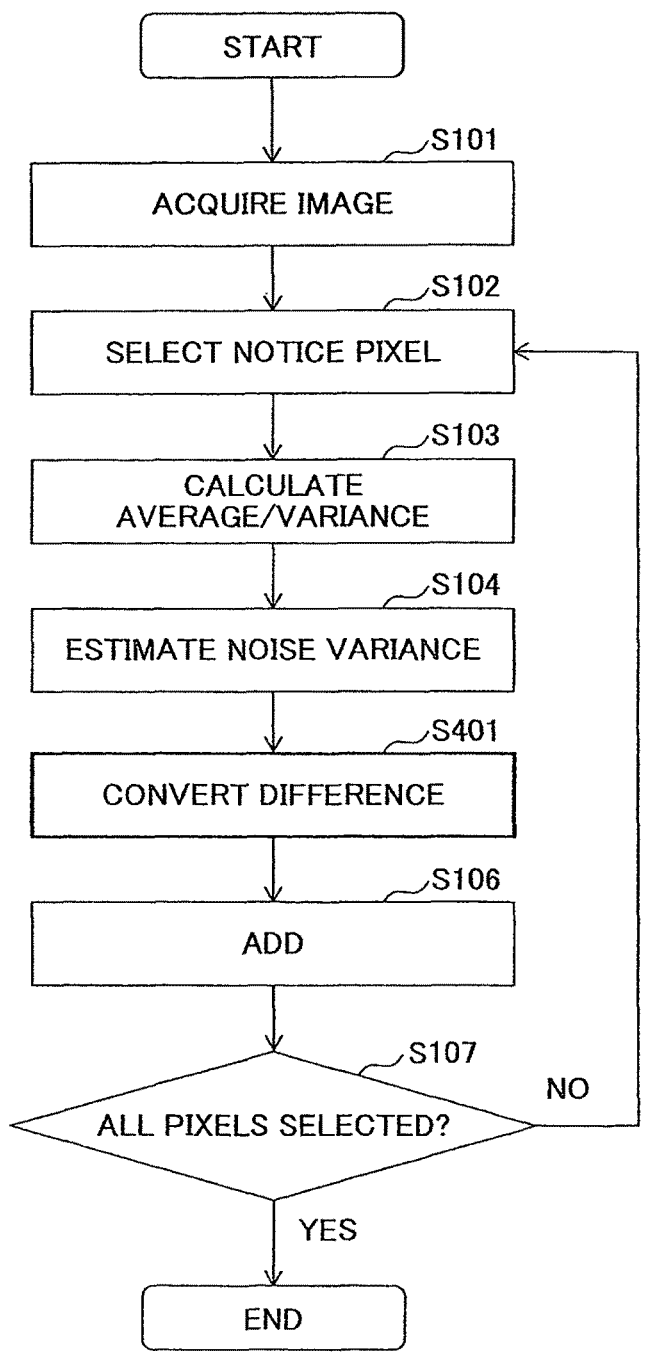
FIG. 20 shows an example of a flowchart for illustrating the procedure of the noise reduction processing (Fifth Embodiment)

FIG. 20 shows an example of a flowchart for illustrating the procedure of the noise reduction processing. In FIG. 20, steps the same as those of FIG. 3 are denoted by the same reference numerals and their descriptions are omitted.

(S401)

In step S401, the difference conversion block 401 converts the size of the variance of the difference vector s in the specific direction e and that of the variance of the difference vector s in a direction e⊥ perpendicular to the specific direction e.

Figure 21A:
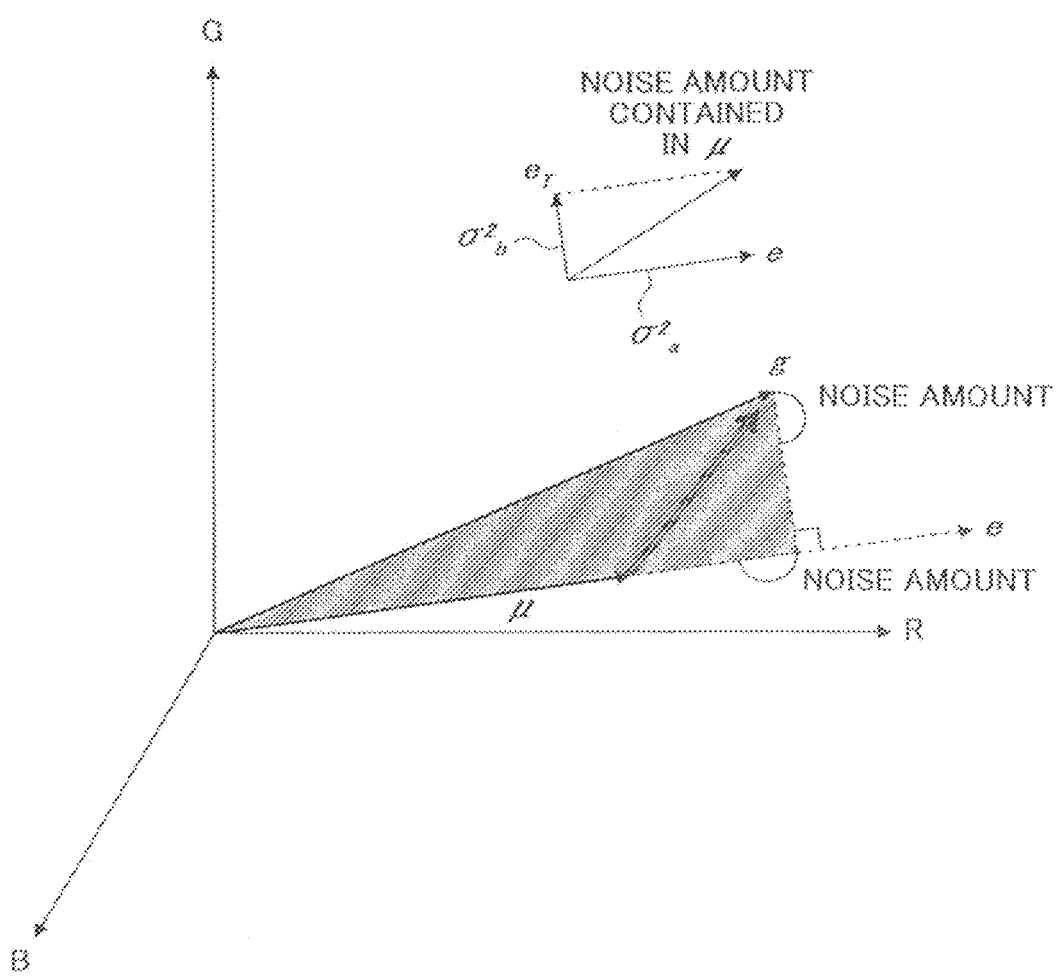

FIGS. 21A and 21B show examples of diagrams for schematically illustrating the projection of the difference vector s in a two-dimensional direction. As shown in FIG. 21A, a plane including the difference vector s and the specific direction e is uniquely determined. Furthermore, a noise amount is found for each RGB component. The variance of the pixel values in the specific direction e is found as in the case of the first embodiment. A noise amount in the direction e⊥ perpendicular to the specific direction e is the variance in the direction e⊥ perpendicular to the specific direction e in the variance-covariance matrix $\Sigma_{noise}$ of noise. A texture amount in the direction e⊥ perpendicular to the specific direction e is the variance in the direction e⊥ perpendicular to the specific direction e of the variance-covariance matrix obtained by subtracting the variance-covariance matrix $\Sigma_{noise}$ of the noise from the variance-covariance matrix $\Sigma_{total}$ of the similarity region.

FIG. 21B shows an example of the difference vector s of which the size of the variance is converted by (a texture amount)/(a noise amount+the texture amount) in each direction. The difference vector s can be converted so as to come close to the specific direction e in such a manner that the difference vector s is converted in accordance with a noise amount in each of the specific direction e and the direction e⊥ perpendicular to the specific direction e. Accordingly, if the texture amount in the direction e⊥ perpendicular to the specific direction e is greater than the noise amount, a lot of information on the notice pixel can be included in the difference vector s to be projected. Conversely, if the texture amount in the direction e⊥ perpendicular to the specific direction e is smaller than the noise amount, noise can be reduced in such a manner that the difference vector s to be projected is made close to the average-value vector $\mu$ of the similarity region. Note that as the specific direction e, any of the constant RGB ratio direction, the brightness direction, and the maximum variance direction can be used.

Furthermore, for example, if the brightness direction is used as the specific direction e, the size of the difference vector s in the direction e⊥ perpendicular to the specific direction e can be reduced at a ratio higher than that in the specific direction e. Human eyes are not sensitive to the direction perpendicular to the brightness direction. Therefore, even if the difference vector s in the direction perpendicular to the specific direction e is compressed greater than the noise amount in the direction, human's visual perception to this variation is small. Accordingly, color noise can be efficiently reduced while preserving a brightness component important to human's visual perception.

Accordingly, by converting the difference vector s in the two-dimensional sub-space of the RGB space, the noise reduction device 100 of this embodiment can reduce noise in color images while properly compressing information on the notice pixel in accordance with the noise amount.

Sixth Embodiment

In the first embodiment, the difference vector s is projected in the one-dimensional direction of the specific direction e to reduce noise. Furthermore, in the fifth embodiment, the difference vector s is converted into the vector of the two-dimensional sub-space to reduce noise. This embodiment refers to the noise reduction device 100 that converts the difference vector s into a vector of a three-dimensional sub-space to reduce noise. In other words, the noise reduction device 100 of this embodiment standardizes noise reduction in a three-dimensional color space (RGB color space).

Note that a functional block diagram of this embodiment is the same as that of FIG. 2 or that of FIG. 19, in which the difference conversion block 105 or the difference conversion block 401 is particularly expanded to correspond to processing in a three-dimensional space. Furthermore, the procedure of noise reduction processing is the same as that of FIG. 3 or that of FIG. 20.

The standardization of the first and fifth embodiments refers to the processing of linearly converting the difference vector s and adding the same to the average-value vector of the similarity region. Specifically, it is equivalent to the processing of calculating an output pixel value f in the following formula using the average-value vector $\mu$ of the similarity region, a notice pixel value g, and a matrix W of linear conversion.

$$f=\mu+W(g-\mu) \qquad (8)$$

The matrix W can be set, for example, as follows.

$$W=\Sigma_{texture}(\Sigma_{noise}+\Sigma_{texture})^{-1} \qquad (9)$$

$\Sigma_{noise}$ represents the variance-covariance matrix of noise, and $\Sigma_{texture}$ represents the variance-covariance matrix of a texture. The variance-covariance matrix $\Sigma_{texture}$ of the texture is obtained by subtracting the variance-covariance matrix $\Sigma_{noise}$ of the noise from the variance-covariance matrix $\Sigma_{total}$ of the similarity region. Accordingly, it is clear from the formula (9) that the matrix W is a matrix allowing the calculation of (a texture amount)/(a noise amount+the texture amount) in each direction of the three-dimensional space.

The formula (8) is the processing of linearly converting the difference vector $(g-\mu)$ in the three-dimensional space and adding the same to the average-value vector $\mu$. Therefore, the difference vector s can be converted into the vector of the three-dimensional space in consideration of a balance between a noise amount and a texture amount for each of three desired directions in the color space.

Figure 22:
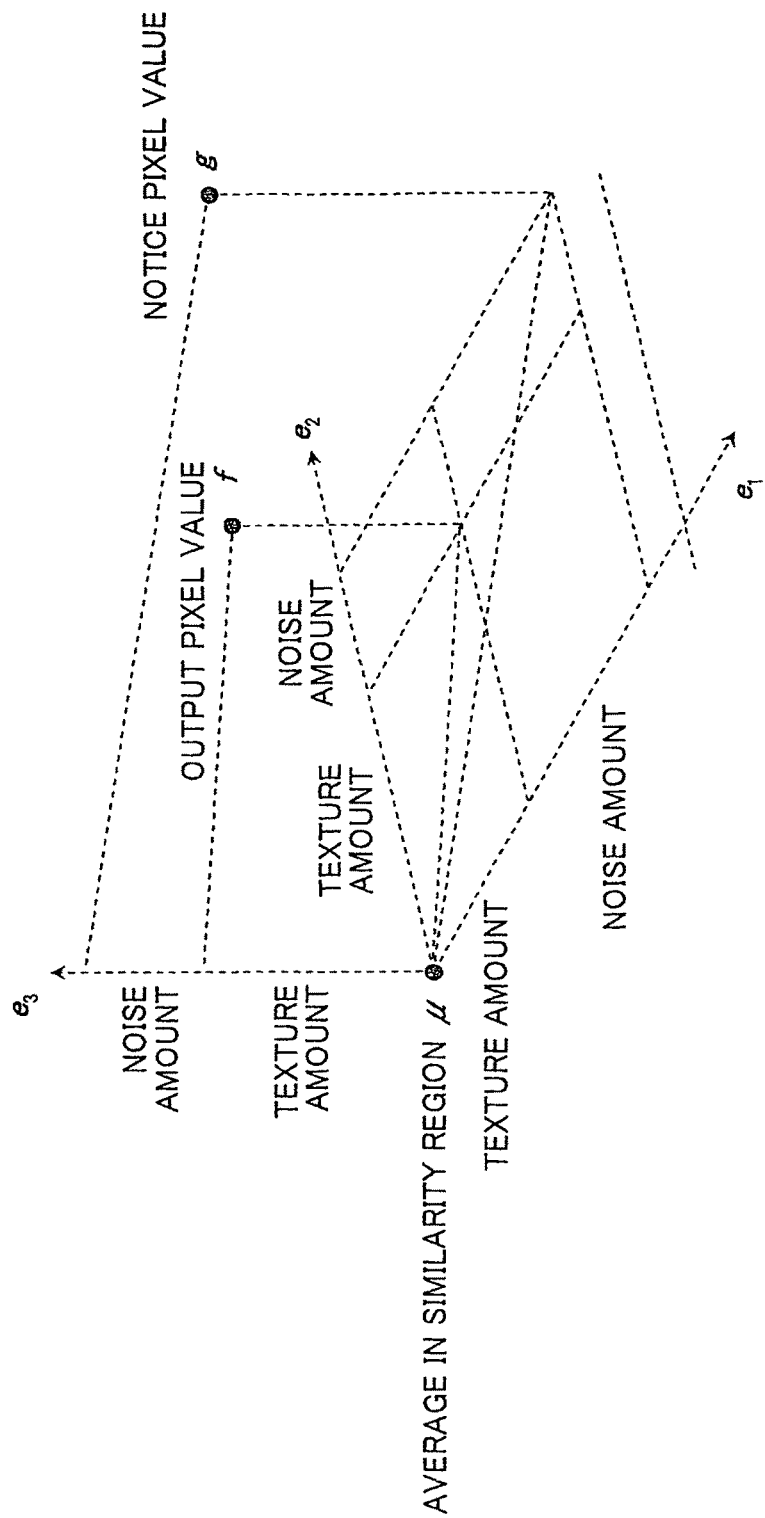
FIG. 22 shows an example of a diagram for schematically illustrating the projection of the difference vector in a three-dimensional direction.

FIG. 22 shows an example of a diagram for schematically illustrating the projection of the difference vector s in the three-dimensional direction. Directions $e_1$, $e_2$, and $e_3$ represent the directions of the inherent vectors of W. If a noise amount included in the notice pixel g is found in advance, conversion corresponding to (the texture amount)/(a noise amount+the texture amount) can be made possible for each of the directions $e_1$, $e_2$, and $e_3$. Based on variance in each direction after the conversion, the vector f of an output pixel value can be found.

In a direction in which the texture amount is larger than the noise amount, the value gets close to the notice pixel value. As a result, a lot of information on the notice pixel can be left in an output pixel value. On the other hand, in a direction in which the texture amount is smaller than the noise amount, the value gets close to an average of the similarity region. As a result, noise reduction processing can be properly performed.

Furthermore, if variance in a specific direction $e_0$ (unit vector) is left in a relatively large amount, a component useful in human's perception can be selectively left in a large amount. To this end, the matrix W in linear conversion is set as follows.

$$W=(I+\alpha e_0 e_0^T)\Sigma_{texture}(\Sigma_{noise}+\Sigma_{texture})^{-1} \qquad (10)$$

where I represents a 3×3 unit matrix. $\alpha$ represents a setting parameter for setting an emphasis degree of variance in the specific direction $e_0$. The larger $\alpha$ is, the easier the emphasis of the variance in the specific direction $e_0$ can be made. As the specific direction $e_0$, the constant RGB ratio direction, the brightness direction, the maximum variance direction, etc., can be used.

Furthermore, in order to increase flexibility in design, the matrix W may be set as follows by the use of 3×3 parameter matrices A and B.

$$W=A\Sigma_{texture}(\Sigma_{noise}+\Sigma_{texture})^{-1}+B \qquad (11)$$

The formula (11) is equivalent to "α×(the noise amount)/(the noise amount+the texture amount)" described in "(Modification of Processing of S105)" of the first embodiment. In other words, by the adjustment of A and B, a coefficient to be multiplied by a projected vector can have the characteristic of decreasing as the noise amount increases and increasing as the texture amount increases.

Accordingly, by standardizing noise reduction of the RGB space in the three-dimensional sub-space, the noise reduction device 100 of this embodiment can leave a lot of information on the notice pixel and make a value close to an average of the similarity region in accordance with the size of the noise amount in each direction.

As described above, the noise reduction device 100 of the embodiments can perform noise reduction while preserving significant elements such as an edge with which humans perceive images by performing the filter processing on pixels having the degree of similarity less than or equal to the predetermined threshold to the notice pixel. Furthermore, the noise reduction device 100 can preserve signals having a small amplitude by adding the difference vector to, for example, the average-value vector $\mu$. Furthermore, the noise reduction device 100 can properly reduce non-additive noise whose intensity depends on a signal value in consideration of the texture amount of an original image by estimating the non-additive noise in a color image and converting the output of the filter processing in accordance with the noise amount and the texture amount. Furthermore, since changes in pixel values due to the noise reduction processing are restricted to the specific direction of the color space, the noise reduction device 100 can effectively reduce color noise without causing color shifts.

The present application is based on Japanese Priority Application No. 2009-062876 filed on Mar. 16, 2009, with the Japan Patent Office, the entire contents of which are hereby incorporated by reference.

The invention claimed is:

1. A noise reduction device that applies noise reduction processing to a pixel value of a notice pixel of a color image by using pixel values of pixels including the notice pixel of a neighboring region, the noise reduction device comprising:
  a processing device including at least one processor and a memory, the processing device being configured to implement,
    a representative-value vector calculation unit configured to extract from the neighboring region the pixels of a similarity region having a degree of similarity, greater than or equal to a threshold, to the notice pixel in a predetermined color space and calculates a representative-value vector of the pixels of the similarity region;
    a difference projection unit configured to project a difference vector between a notice-pixel vector of the notice pixel and the representative-value vector in a specific direction of the color space; and
    a pixel-value correction unit configured to replace the pixel value of the notice pixel with an element of a vector obtained by adding the difference vector projected in the specific direction to the representative-value vector.

2. The noise reduction device according to claim 1, wherein
  the difference projection unit is configured to apply linear conversion to the difference vector by using a conversion coefficient corresponding to a noise amount and a texture amount of the representative-value vector.

3. The noise reduction device according to claim 2, wherein
  the difference projection unit is configured to change a size of the difference vector projected in the specific direction in accordance with the noise amount and the texture amount of the representative-value vector.

4. The noise reduction device according to claim 2, wherein
  the difference projection unit is configured to change a length of the difference vector both in the specific direction and a direction perpendicular to the specific direction in accordance with the noise amount and the texture amount of the representative-value vector.

5. The noise reduction device according to claim 3, wherein
  the specific direction is a constant RGB-ratio direction in which an element of the representative-value vector and an RGB ratio are constant.

6. The noise reduction device according to claim 3, wherein
  the specific direction is a brightness direction.

7. The noise reduction device according to claim 3, wherein the processing device is further configured to implement,
  a maximum variance direction calculation unit configured to determines a maximum variance direction of pixel values of the pixels of the similarity region; wherein
  the specific direction is used as the maximum variance direction.

8. The noise reduction device according to claim 2, wherein the representative-value vector has information indicating an average of the pixel values of the pixels of the similarity region, and
  wherein the processing device is further configured to implement,
    a noise amount estimation unit configured to estimate a noise amount corresponding to the information indicating the average as the noise amount of the representative-value vector based on a map having registered therein a relationship between the pixel values and variance of the noise amounts of the pixel values.

9. The noise reduction device according to claim 8, wherein
  the noise amount estimation unit is configured to calculate the texture amount by subtracting variance of the noise amount of the similarity region from variance of the representative-value vector.

10. The noise reduction device according to claim 9, wherein
  the noise amount estimation unit is configured to apply frequency conversion to the pixels of the similarity region, estimates the noise amount of the representative-value vector based on the information indicating the average of the pixels to which the frequency conversion is applied, and calculates the texture amount.

11. A noise reduction method that applies noise reduction processing to a pixel value of a notice pixel of a color image by using pixel values of pixels including the notice pixel of a neighboring region, the noise reduction method comprising:
  extracting from the neighboring region the pixels of a similarity region having a degree of similarity, greater than or equal to a threshold, to the notice pixel in a predetermined color space and calculating a representative-value vector of the pixels of the similarity region;
  projecting a difference vector between a notice-pixel vector of the notice pixel and the representative-value vector in a specific direction of the color space; and
  replacing the pixel value of the notice pixel with an element of a vector obtained by adding the difference vector projected in the specific direction to the representative-value vector.

* * * * *